United States Patent
Chhipa et al.

(10) Patent No.: US 11,769,172 B2
(45) Date of Patent: Sep. 26, 2023

(54) DISPLAY DEVICE FOR TRANSMITTING ADVERTISEMENT CONTENT AND METHOD FOR CONTROLLING SAME

(71) Applicant: Samsung Electronics Co., Ltd., Suwon-si (KR)

(72) Inventors: Prakash Chandra Chhipa, Noida (IN); Ravinder Dhiman, Noida (IN); Vivek Pal, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 17/283,317

(22) PCT Filed: Oct. 18, 2019

(86) PCT No.: PCT/KR2019/013734
§ 371 (c)(1),
(2) Date: Apr. 7, 2021

(87) PCT Pub. No.: WO2020/080874
PCT Pub. Date: Apr. 23, 2020

(65) Prior Publication Data
US 2022/0005072 A1  Jan. 6, 2022

(30) Foreign Application Priority Data

Oct. 19, 2018 (IN) .............................. 201811039652
Oct. 15, 2019 (KR) ........................ 10-2019-0127855

(51) Int. Cl.
*G06Q 30/00* (2023.01)
*G06Q 30/0251* (2023.01)

(52) U.S. Cl.
CPC ................................. *G06Q 30/0255* (2013.01)

(58) Field of Classification Search
CPC .................................................. G06Q 30/0255
See application file for complete search history.

(56) References Cited

U.S. PATENT DOCUMENTS

| 2012/0159540 A1 | 6/2012 | Park et al. |
| 2014/0188607 A1 | 7/2014 | Yang |

(Continued)

FOREIGN PATENT DOCUMENTS

| CN | 107563817 A | 1/2018 |
| CN | 107679923 A | 2/2018 |

(Continued)

OTHER PUBLICATIONS

Is Blockchain Ready to Revolutionize Online Advertising? Matti Pärssinen et al. Digital Object identifier; Oct. 1, 2018. (Year: 2018).*

(Continued)

*Primary Examiner* — Yehdega Retta
(74) *Attorney, Agent, or Firm* — Jefferson IP Law, LLP

(57) ABSTRACT

The present disclosure relates to a display device for transmitting advertisement content and a method for controlling the display device. According to an embodiment of the present disclosure, the display device may include a communication unit configured to transmit and receive data, a display to display content, a memory storing one or more instructions, and at least one processor configured to execute the one or more instructions stored in the memory. The at least one processor may obtain viewing information about content being displayed, obtain a plurality of smart contracts corresponding to a plurality of advertisement content items, respectively, determine advertisement content related to the content from among the plurality of advertisement content items based on the viewing information and the plurality of smart contracts, receive and reproduce the determined advertisement content, and share blocks including the plurality of smart contracts with an advertiser device, which provides the plurality of advertisement content items, and other display devices.

14 Claims, 35 Drawing Sheets

(56) References Cited

U.S. PATENT DOCUMENTS

| | | | |
|---|---|---|---|
| 2014/0195934 A1* | 7/2014 | Harrison | H04L 65/60 |
| | | | 715/758 |
| 2018/0075473 A1 | 3/2018 | Hammock et al. | |
| 2018/0089651 A9 | 3/2018 | Lund et al. | |
| 2018/0108035 A1 | 4/2018 | Tiwari | |
| 2018/0204242 A1 | 7/2018 | Choi et al. | |
| 2019/0205932 A1* | 7/2019 | Ericson | G06Q 20/0658 |
| 2019/0370866 A1* | 12/2019 | Lawbaugh | G06Q 30/0254 |
| 2021/0119801 A1 | 4/2021 | Kim et al. | |

FOREIGN PATENT DOCUMENTS

| | | | | |
|---|---|---|---|---|
| KR | 10-2012-0076280 A | 7/2012 | | |
| KR | 10-2018-0069356 A | 6/2018 | | |
| KR | 10-2018-0104586 A | 9/2018 | | |
| WO | WO-2012150972 A1 * | 11/2012 | | G06Q 30/0241 |

OTHER PUBLICATIONS

Survey: Consumers willing to share personal data for deals, better customer service [Apr. 2017] (=https://marketingland.com/survey-consumers-willing-share-personal data-deals-better-customer-service-212232).

More people are willing to share personal data in return for rewards [Mar. 2017] (=https://mediabuzz.com.sg/research-analysis-trends-mar-2017/more-people-willing-to-sharing-personal-data-in-return-for-rewards).

Japanese Desktop Users See 80%+ Ad Fraud Rates in Q1 2017 [May 2017] (=https://www.mediapost.com/publications/article/300741/japanese-desktop-users-see-80-ad-fraud-rates-in.html).

Web Publishers Left With Little After Middlemen Split Ad Spoils [Mar. 2010] (=http://adage.com/article/digital/web-publishers-left-ad-spoils-split/142332/).

Smart TVs pose huge security risks [Jan. 2016] (=https://betanews.com/2016/01/20/smart-tvs-pose-huge-security-risks/).

Nexledger Universal, Enterprise-ready blockchain platform, Blockchain made fast and easy, https://www.samsungsds.com/global/en/solutions/off/nexledger/Nexledger.html (Apr. 2017).

Blockchain, Mobile and the Internet of Things [Mar. 2016] (=https://insights.samsung.com/2016/03/17/block-chain-mobile-and-the-internet-of-things/).

LG Starts Taking Its First Steps in Blockchain Technology [Jun. 2017] (=http://infocoin.net/en/2017/06/30/lg-starts-taking-its-first-steps-in-blockchain-technology/).

Sony Develops System for Authentication, Sharing, and Rights Management Using Blockchain Technology [Sep. 2017] (=https://www.sony.net/SonyInfo/News/Press/201708/17-071E/index.html).

Blockchain Technology Applications Flourish in the Banking Industry [Aug. 2017] (=https://insights.samsung.com/2017/08/08/blockchain-technology-applications-flourish-in-the-banking-industry/).

IBM Reveals Proof of Concept for Blockchain-Powered Internet of Things [Jan. 2015] (=https://www.coindesk.com/ibm-reveals-proof-concept-blockchain-powered-internet-things).

Leading the pack in blockchain banking [Sep. 2016] (=https://www.ibm.com/downloads/cas/PA8V4RMX).

Samsung Electronics Turns to Blockchain to Track its Global Supply Chains (Apr. 16, 2018) (=https://www.ccn.com/samsung-electronics-turns-to-blockchain-to-manage-its-global-supply-chains/).

Samsung Wins Public Sector Blockchain Contract for Korean Gov't (Nov. 27, 2017) (=https://cointelegraph.com/news/samsung-wins-public-sector-blockchain-contract-for-korean-govt).

Samsung launches blockchain-based finance platform (Jun. 4, 2018) (=https://thenextweb.com/news/samsung-sds-blockchain-platform).

GitHub, "Decentralized apps (dapps)", https://github.com/ethereum/wiki/wiki/Decentralized-apps-(dapps)/014bf4d1767472e9567aaf824b31f22d6d71f436 (Feb. 2018).

Basic Attention Token, "BAT—Making Crypto and DeFi accessible and useable for everyone", https://basicattentiontoken.org/ (May 2017).

AdEx, "Announcing: The AdEx Crowdsale Bounty Campaign", https://www.adex.network/blog/@adex_by_stremio/announcing-the-adex-crowdsale-bounty-campaign-9e59cd0024be/ (Jun. 2017).

Papyrus—Decentralized Advertising Ecosystem https://www.youtube.com/watch?v=J5Bt0PYQF2I (Sep. 9, 2017).

International Search Report dated Feb. 5, 2020, issued in International Patent Application No. PCT/KR2019/013734.

Indian Office Action dated Apr. 23, 2021, issued in Indian Patent Application No. 201811039652.

* cited by examiner

| Advertisement Details | Ad Targeting Type |
| | Ad Targeting Type |
| | Ad Targeting Type |
| | Ad Targeting Type |

Ad Targeting Type
- ☑ Sociodemographic
  - Age
  - Gender
  - Income
  - Nationality
- ☑ Time-based
- ☑ Show on Mobile
- ☑ Location-based
- ☑ Personalised
  - Interests
  - Hobbies
  - Lifestyle

[ Save ]

FIG. 28

DISPLAY DEVICE FOR TRANSMITTING ADVERTISEMENT CONTENT AND METHOD FOR CONTROLLING SAME

TECHNICAL FIELD

The present disclosure relates to a display device for transmitting advertisement content and a method for controlling the display device, and more specifically, to a display device for receiving and reproducing advertisement content on a blockchain network and a method for controlling the display device.

BACKGROUND ART

Recently, as the number of users of electronic devices such as smart phones, tablet computers, and smart TVs has increased, the demand for data for media content such as movies, live sports games, and TV shows has also increased. Advertisement content is also broadcast to users together with media content. For example, commercial advertisements are displayed to users while the users are watching movies, live sports games, or TV shows, and the same advertisement is broadcast to all users. Because of the various ages and interests of the users watching specific content, the advertisement being broadcast may not be effective for all of the users. Repetitive display of the ineffective advertisement may inconvenience the users, and may cause advertiser's loss by not attracting customers.

As a conventional technology to solve the above drawback, various targeted advertising systems exist for providing advertisements customized for users. The prior art provides advertisements suitable for users based on the users' inputs, content search histories, watching histories, or the like. However, the prior art has the following problems.

The conventional targeted advertising systems anonymously collect user data related to users, such as content search histories and watching histories of the users, and share the collected user data with advertisers. Accordingly, as the user data is shared, the privacy of users may be compromised. Also, due to privacy concerns, users are skeptical about sharing the user data and hesitate to use the targeted advertising systems.

In addition, without broadcasting a targeted advertisement to users based on the collected user data, advertisers cannot know the number of users who watched the advertisement or how long the users watched the advertisement. Therefore, the advertisers cannot gauge the effectiveness of advertising.

Moreover, there are many third party intermediaries between advertisers and users. Advertisers have to pay a lot of money to the intermediaries to broadcast their advertisements on multiple channels. As a result, the advertisers spend more money and the transparency of an advertising process disappears as well.

Accordingly, there is a need for a display device for transmitting targeted advertisement content that provides effective advertisements and guarantees the privacy of user data and a method for controlling the display device.

DESCRIPTION OF EMBODIMENTS

Technical Problem

The present disclosure relates to a display device for transmitting advertisement content, and a method for controlling the display device. Specifically, the present disclosure guarantees privacy, and provides advertisements suitable for users based on users' inputs, content search histories, watching histories, or the like.

Solution to Problem

A display device according to an embodiment of the present disclosure may include a communication unit configured to transmit and receive data, a display to display content, a memory storing one or more instructions, and at least one processor configured to execute the one or more instructions stored in the memory. The at least one processor may obtain viewing information about content being displayed, obtain a plurality of smart contracts corresponding to a plurality of advertisement content items, respectively, determine advertisement content related to the content from among the plurality of advertisement content items based on the viewing information and the plurality of smart contracts, and receive and reproduce the determined advertisement content. The at least one processor may share blocks including the plurality of smart contracts with an advertiser device which provides the plurality of advertisement content items, and other display devices, and the blocks may be connected to each other in the form of a chain.

Advantageous Effects of Disclosure

According to the present disclosure, users' privacy is secured, and advertisements suitable for users may be provided based on the users' inputs, content search histories, viewing histories, or the like.

BRIEF DESCRIPTION OF DRAWINGS

FIG. 14 is a diagram illustrating an advertiser interface in an advertiser device, according to an embodiment of the present disclosure.

FIG. 28 is a diagram illustrating an example of displaying personalized advertisement content, according to an embodiment of the present disclosure.

BEST MODE

Figure 1:
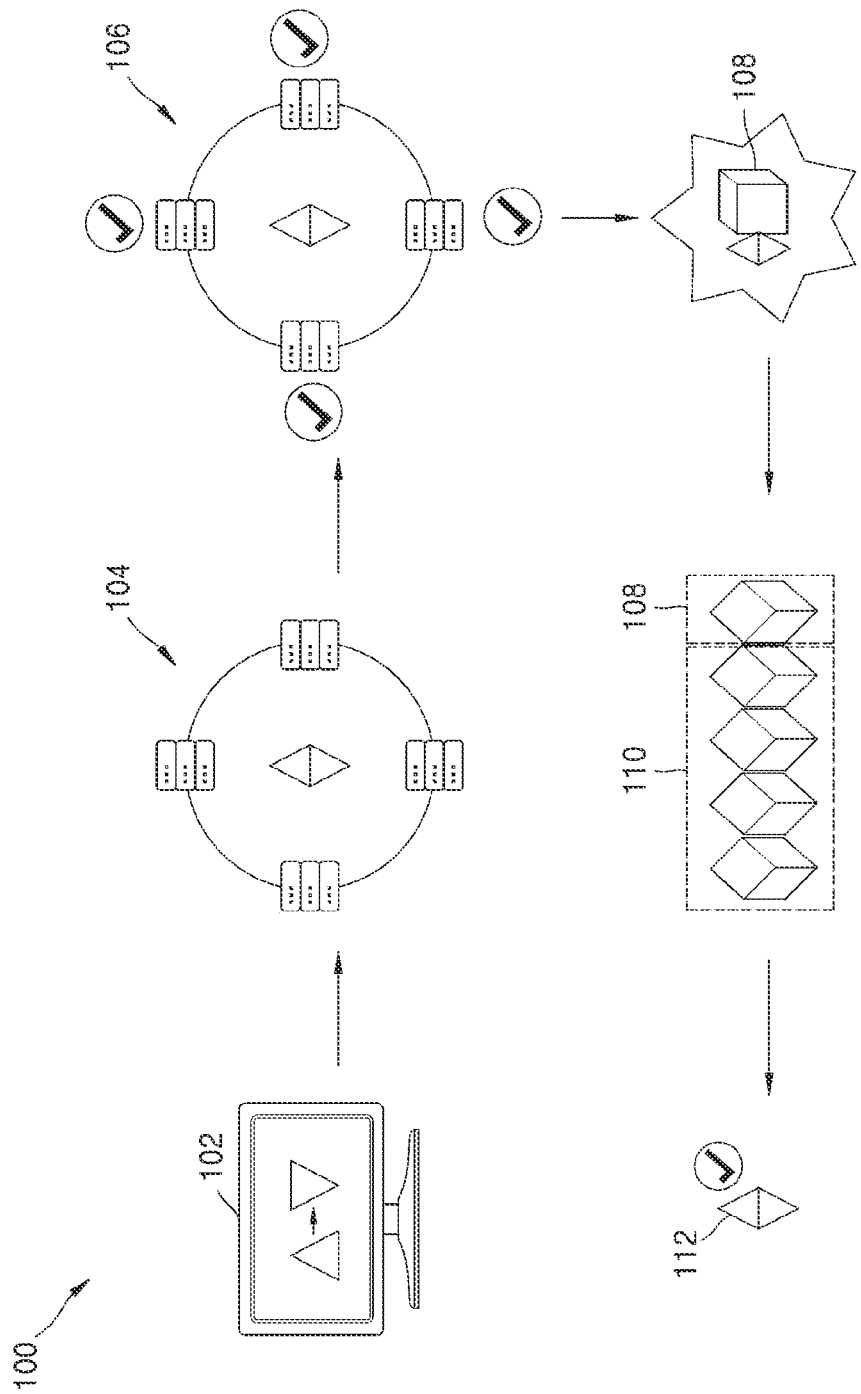
FIG. 1 is a block diagram of a blockchain network, according to an embodiment of the present disclosure.

A display device according to an embodiment of the present disclosure may include a communication unit configured to transmit and receive data, a display to display content, a memory storing one or more instructions, and at least one processor configured to execute the one or more instructions stored in the memory. The at least one processor may obtain viewing information about content being displayed, obtain a plurality of smart contracts corresponding to a plurality of advertisement content items, respectively, determine advertisement content related to the content from among the plurality of advertisement content items based on the viewing information and the plurality of smart contracts, and receive and reproduce the determined advertisement content. The at least one processor may share blocks including the plurality of smart contracts with an advertiser device which provides the plurality of advertisement content items, and other display devices, and the blocks may be connected to each other in a form of a chain.

The viewing information according to an embodiment of the present disclosure may include at least one of information about a user viewing the content, metadata of the content, information about a user's viewing history of the content, or information about a date of reproduction or a number of times of reproduction of the content.

The plurality of smart contracts according to an embodiment of the present disclosure may include advertisement content parameters corresponding to the plurality of advertisement content items, respectively, and the at least one processor may determine the advertisement content by matching the advertisement content parameters with the viewing information.

The advertisement content parameters according to an embodiment of the present disclosure may include at least one of information about a user who will view the advertisement content, information about the reproduction duration of the advertisement content, or advertiser information.

The advertisement content according to an embodiment of the present disclosure may include advertisement content metadata. The at least one processor may receive the determined advertisement content by using the advertisement content metadata. The advertisement content metadata according to an embodiment of the present disclosure may include at least one of a reproduction duration of the advertisement content, a title, a language, a storage location, or a reproduction mode of the advertisement content.

The at least one processor according to an embodiment of the present disclosure may control the communication unit to broadcast record information indicating that the advertisement content has been determined, and, when a signal indicating that a new block generated based on the record information has been appended to the blocks in a form of a chain is received, the at least one processor may receive the determined advertisement content based on the received signal.

The new block according to an embodiment of the present disclosure may be appended to the blocks in a form of a chain, and may be shared with the advertiser device and the other display devices.

The at least one processor according to an embodiment of the present disclosure may provide exposure data of the determined advertisement content to the advertiser device, and the exposure data of the advertisement content may include at least one of a number of times the advertisement content is reproduced, or a reproduction duration of the advertisement content.

The at least one processor according to an embodiment of the present disclosure may detect an occurrence of a predefined event, and, when the occurrence of the predefined event is detected, the at least one processor may reproduce the received advertisement content, and the predefined event may include at least one of an interrupt signal, an audio, or a user input.

The display according to an embodiment of the present disclosure may include a first display and a second display. The at least one processor according to an embodiment of the present disclosure may control the first display and the second display such that the advertisement content is reproduced on the second display while the content is being displayed on the first display.

The at least one processor according to an embodiment of the present disclosure may control the communication unit to transmit, to an external device interworking with the display device, the advertisement content and information for controlling reproduction of the advertisement content.

According to an embodiment of the present disclosure, a method of controlling a display device may include displaying content, obtaining viewing information about the content, obtaining a plurality of smart contracts corresponding to a plurality of advertisement content items, respectively, determining advertisement content related to the content from among the plurality of advertisement content items based on the viewing information and the plurality of smart contracts, and receiving and reproducing the determined advertisement content. Blocks including the plurality of smart contracts may be shared with an advertiser device which provides the plurality of advertisement content items, and other display devices, and the blocks may be connected to each other in the form of a chain.

According to an embodiment of the present disclosure, a computer-readable recording medium storing one or more instructions for controlling a display device may cause the display device to display content, obtain viewing information about the content, obtain a plurality of smart contracts corresponding to a plurality of advertisement content items, respectively, determine advertisement content related to the content from among the plurality of advertisement content items based on the viewing information and the plurality of smart contracts, and receive and reproduce the determined advertisement content. The computer-readable recording medium may store instructions for causing blocks including the plurality of smart contracts to be shared with an advertiser device which provides the plurality of advertisement content items and other display devices, and for causing the blocks to be connected to each other in the form of a chain.

MODE OF DISCLOSURE

Various embodiments of the present disclosure will be described in more detail with reference to the accompanying drawings. However, the present disclosure may be implemented in various different forms and should not be construed as being limited to any specific structure or function presented in the following description. In contrast, the embodiments are provided for the detailed and complete explanation of the present disclosure. According to the description of the present disclosure, it will be obvious to those skilled in the art that the scope of the present disclosure includes any embodiment of the present disclosure disclosed herein regardless of whether the present embodiment is implemented independently or together with any other embodiment. For example, the method and device disclosed in the present specification may be actually implemented by using any embodiment disclosed in the present specification. In addition, any embodiment of the present disclosure may be implemented by using one or more elements presented in the appended claims.

Throughout the present specification, reference to "an embodiment" or "embodiment" means that a particular feature, structure, characteristic, or function described in connection with the embodiment is included in at least one embodiment of the present disclosure. Thus, appearances of the phrases "in an embodiment," or "according to an embodiment," in various places throughout the present specification are not necessarily referring to the same embodiment or example.

The terms used in the present disclosure are selected from among common terms that are currently widely used in consideration of their function in the present disclosure, however, the terms may be different according to an intention of one of ordinary skill in the art, a precedent, or the advent of new technology. In addition, terms arbitrarily selected by the applicant are used in specific case, and in this case, its meaning will be described in the corresponding description of the disclosure. Accordingly, the terms used in this specification should be interpreted on the basis of substantial implications that the terms have and the content across this specification not the simple names of the terms.

It will be understood that, although the terms such as "first" or "second" may be used herein to describe various elements, these elements should not be limited by these terms. The terms are used only to distinguish one element from another element. For example, without departing from the scope of the present disclosure, a first element may be referred to as a second element, and similarly, a second element may be referred to as a first element. The term "and/or" includes any and all combinations of one or more of the associated listed items.

Throughout the present specification, when a part "includes" or "comprises" an element, unless there is a particular description contrary thereto, the part can further include other elements, not excluding the other elements. As used herein, the term "unit" refers to a software element or a hardware element, such as a field programmable gate array (FPGA) or an application specific integrated circuit (ASIC), which performs a certain function. However, the "unit" does not always have a meaning limited to software or hardware. The "unit" may be constructed either to be stored in an addressable storage medium or to execute one or more processors. Thus, for example, the term "unit" may include elements such as software elements, object-oriented software elements, class elements and task elements, processes, functions, attributes, procedures, subroutines, segments of program code, drivers, firmware, micro-code, circuits, data, a database, data structures, tables, arrays, or variables. Functions provided by the elements and "units" may be combined into the smaller number of elements and "units", or may be divided into additional elements and "units".

All of the "units" of the present disclosure may be controlled by at least one processor, and the at least one processor may perform operations performed by the "units" of the present disclosure.

Also, in the drawings, parts irrelevant to the description are omitted in order to clearly describe the embodiments of the present disclosure, and like reference numerals designate like elements throughout the present specification.

Throughout the present specification, it will be understood that when an element is referred to as being "connected to" another element, it may be "directly connected to" the other element or be "electrically connected to" the other element through an intervening element.

The term "exemplary" is used as the meaning of "used as an example" throughout the present specification. Any embodiment described herein as "exemplary" is by no means necessarily to be interpreted as being preferred or having advantages over other embodiments.

The embodiments of the present disclosure may be described from the viewpoint of functions or blocks performing functions. Blocks that may be referred to as "units" or "modules" of the present disclosure may be physically implemented by analog or digital circuits such as logic gates, integrated circuits, microprocessors, microcontrollers, memories, passive electronic components, active electronic components, optical components, hardwired circuits, or the like, and may optionally be driven by firmware and software.

The embodiments of the present disclosure may be implemented by using at least one software program executed on at least one hardware device, and may perform a network management function to control elements.

Hereinafter, the embodiments of the present disclosure will be described in detail with reference to the accompanying drawings.

FIG. 1 is a block diagram of a blockchain network, according to an embodiment of the present disclosure.

A blockchain is an unforgeable distributed storage that is generated and managed by a peer-to-peer (P2P) network, which collectively complies with a protocol for validating new blocks. In addition, the blockchain is an open, distributed ledger that manages all transaction records between two or more devices. The blockchain denotes a collection in which data blocks generated via a transaction (a unit operation that cannot be split between two parties) are connected in the form of a chain. A representative application of the blockchain is Bitcoin which is a decentralized electronic currency recording transactions of cryptocurrency. In the blockchain, the details of a confirmed transaction that occurs between users for a certain period of time may be stored, and users may have blockchain copies, and the transaction details may be disclosed to everyone.

A blockchain network 100 may include an electronic device 102 connected to a network 104, and the network 104 that is established in a peer-to-peer (P2P) scheme. The network 104 may include a wired/wireless communication network including a TCP/IP network. The wireless communication network may be, but is not limited to, a global system for mobile communications (GSM) network, an enhanced data GSM environment (EDGE) network, a wideband code division multiple access (WCDMA) network, a code division multiple access (CDMA) network, a time division multiple access (TDMA) network, or the like.

When the electronic device 102 performs a new transaction with another device (not shown), the validation of the transaction may be performed through a consensus rule between different electronic devices connected over the network 104. After the transaction is validated (106), a new block 108 may be generated either from the validated transaction, or in a combination of the validated transaction and other existing validated transaction. Thereafter, the new block 108 may be appended to an existing block 110 within the P2P network 104, such that the existing block 110 and the new block 108 are connected to each other in the form of a chain. All electronic devices connected to the network 104 may have copies of blocks connected to each other in the form of a chain, and may confirm a validated transaction 112 through the block 108.

Figure 2:
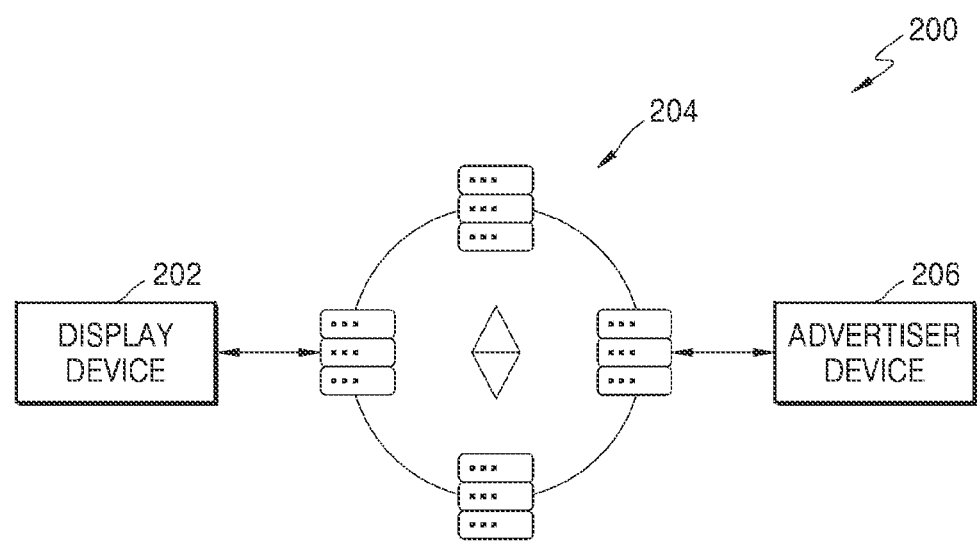
FIG. 2 is a block diagram of a system for transmitting advertisement content, according to an embodiment of the present disclosure.

FIG. 2 is a block diagram of an advertisement content transmission system 200, according to an embodiment of the present disclosure.

The advertisement content transmission system 200 may include a display device (e.g., a TV) 202, a blockchain network 204, and an advertiser device 206. An example of the advertiser device 206 includes a server of an advertiser. The advertiser device 206 may share a plurality of smart contracts corresponding to a plurality of advertisement content items, respectively, in the form of a block, through the blockchain network 204. Throughout the present disclosure, the smart contract may be a computer protocol that facilitates, validates, or executes the settlement or execution of a transaction. Thus, the smart contract may be formatted as executable scripts or other types of computing functions such that one or more predefined operations are performed when the smart contract is executed by an appropriate processor. In many examples, the smart contract may be configured to perform operations each related to whether the condition of the smart contract is satisfied or is not satisfied (e.g., breach of the condition of the smart contract). For example, in a case where the condition of the smart contract is satisfied, the display device 202 may receive, from the advertiser device 206, advertisement content related to content being displayed on the display device 202. As another example, in a case where the condition of the smart contract is satisfied, the advertiser device 206 may deposit a token into a user account.

Figure 3:
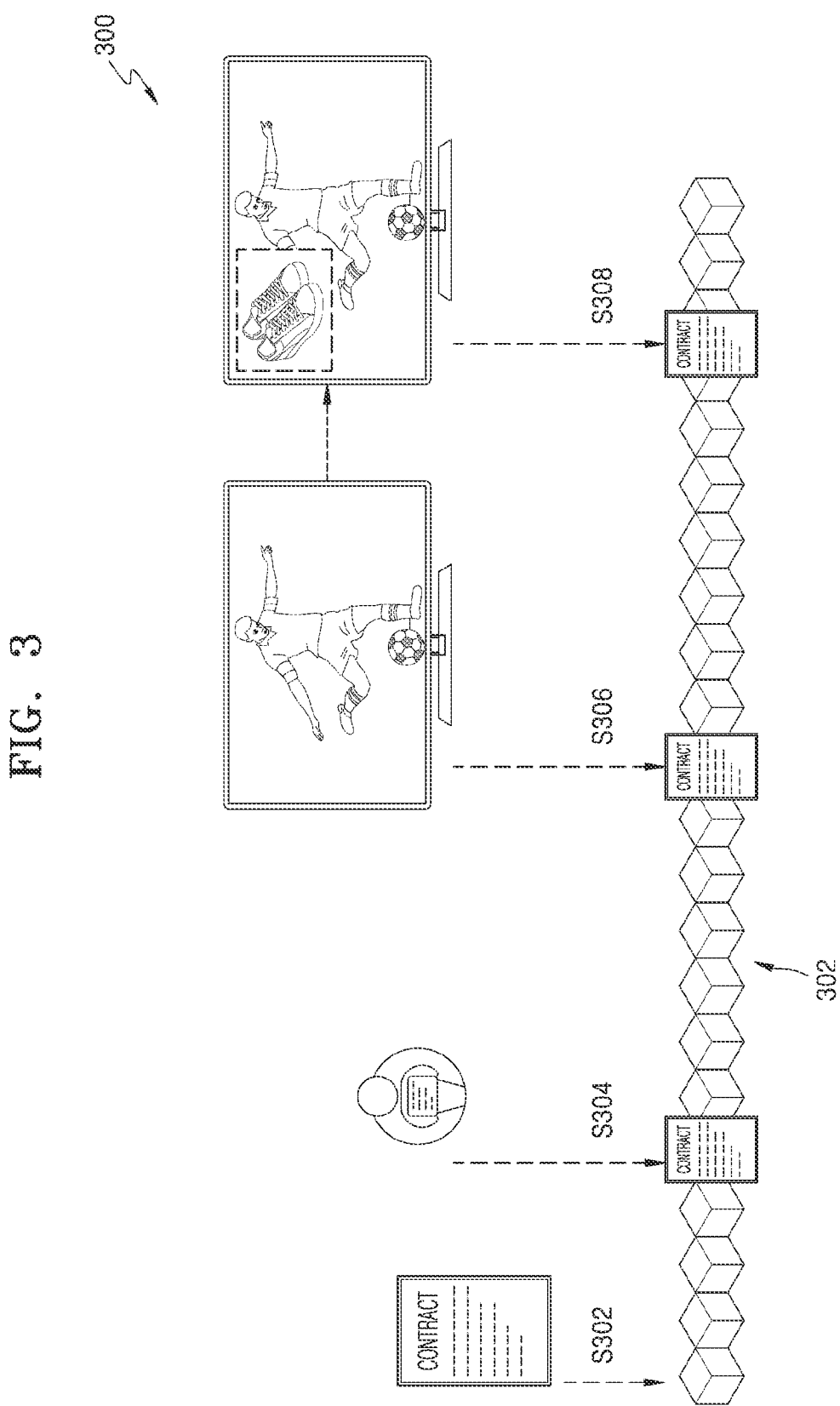
FIG. 3 is a flowchart illustrating a method of transmitting advertisement content, according to an embodiment of the present disclosure.

FIG. 3 is a flowchart illustrating a method of transmitting advertisement content, according to an embodiment of the present disclosure. FIG. 3 is described with reference to the advertisement content transmission system 200 illustrated in FIG. 2.

Blocks 302 represent blocks shared by all electronic devices connected to the blockchain network 204. The blocks 302 are connected to each other in the form of a chain, and each time a block is newly generated, the generated block may be appended from left to right.

In operation S302, the advertiser device 206 may share a smart contract with other electronic devices through the blockchain network 204. In this case, the smart contract may include an advertisement parameter. The advertisement parameter may include at least one of information about a targeted user (e.g., the user's age, income, language, etc.) to view the advertisement content, reproduction time information of the advertisement content, or a time slot (e.g., a weekend or a daytime) at which the advertisement content is to be received. The display device 202 may determine the advertisement content to be received based on the advertisement parameter and viewing information. A method by which the display device 202 determines the advertisement content to be received will be described in detail with reference to FIG. 29.

In a case where the condition of the smart contract is satisfied, in operation S304, the advertiser device 206 may add, to a plurality of smart contracts shared on the blockchain network 204, a plurality of pieces of advertisement content metadata of the advertisement content to be transmitted. Also, the advertiser device 206 may share, on the blockchain network 204, the plurality of pieces of advertisement content metadata, in the form of a new block. The advertisement content metadata may include at least one of a reproduction duration of the advertisement content, a title, a language, a storage location, or a reproduction mode of the advertisement content.

In operation S306, the display device 202 may obtain viewing information about the content that the user is viewing. The viewing information may include at least one of information about the user viewing the content, metadata of the content, information about a user's search history and a user's viewing history related to the content, or information about a date of reproduction or a category of the content. After obtaining the viewing information, the display device 202 may obtain metadata about the advertisement content to be received by the display device 202, by using the viewing information and a matching protocol of the advertisement parameter in the smart contract, so as to determine the advertisement content. In this case, the advertisement content metadata obtained by the display device 202 may correspond to one of the plurality of pieces of advertisement content metadata shared by the advertiser device 206.

When the advertisement content is determined, a new block generated by using a block generation technique (e.g., a proof-of-work, a proof of stake, or hash computation) may be appended to an existing block in the form of a chain. A technique of generating a block will be described in detail with reference to FIG. 17.

According to an embodiment of the present disclosure, the display device 202 may broadcast, to all electronic devices connected to the blockchain network 204, record information indicating that the advertisement content has been determined, and may receive a signal indicating that the new block generated based on the record information has been appended to the blocks 302 in the form of a chain. Thereafter, upon receipt of the signal indicating that the new block has been appended to the blocks 302 in the form of a chain, the display device 202 may receive the advertisement content from the advertiser device 206 based on the advertisement content metadata, and reproduce the received advertisement content. Copies of the blocks 302 to which the new block is appended may be shared by all electronic devices connected to the blockchain network 204.

In operation S308, according to the smart contract, the display device 202 may transmit exposure data of the advertisement content to the advertiser device 206 connected to the blockchain network 204. The exposure data may include at least one of the number of times the advertisement content is reproduced, or a reproduction duration of the advertisement content.

Figure 4:
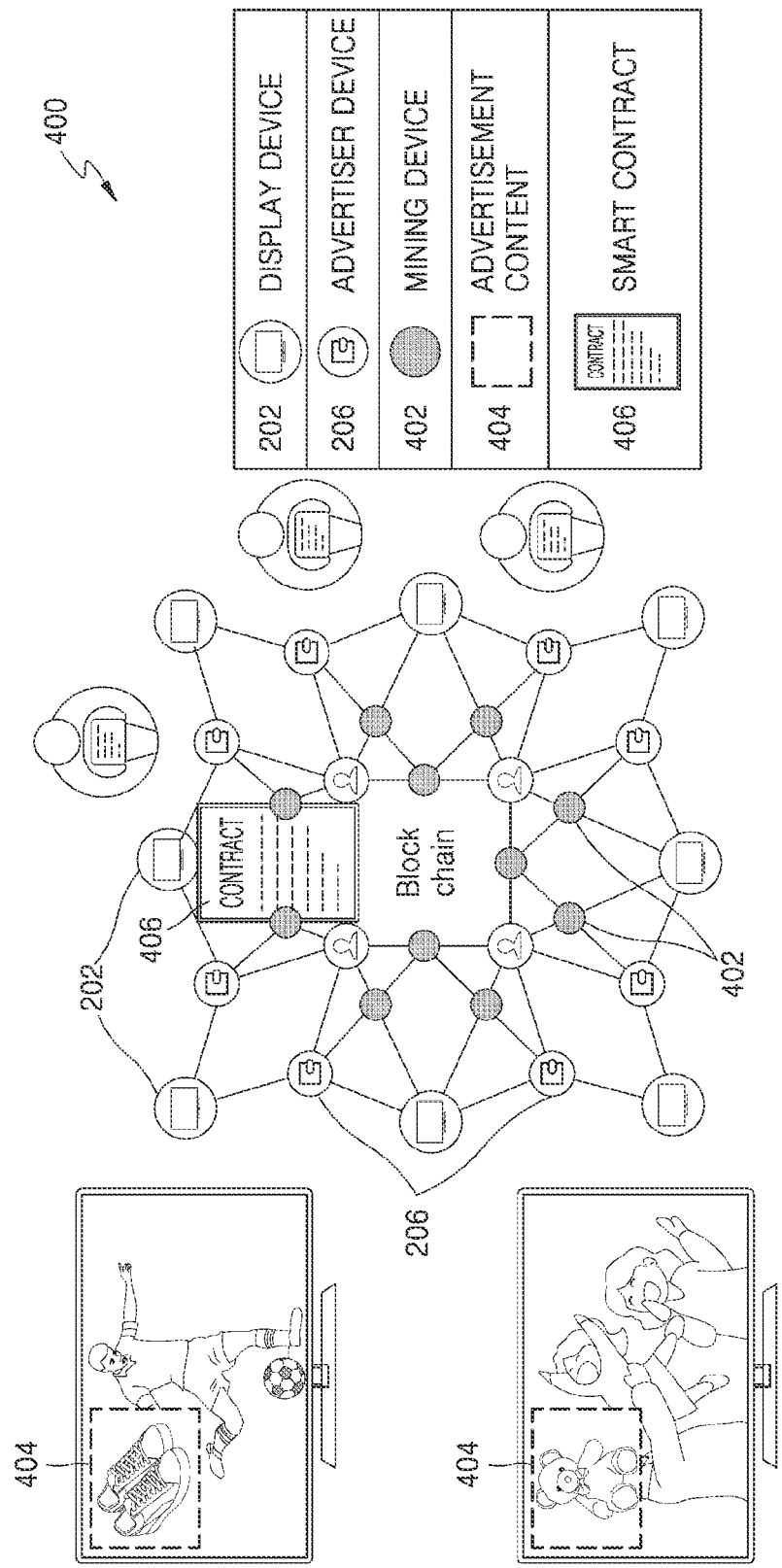
FIG. 4 is a diagram illustrating a system for transmitting advertisement content, according to an embodiment of the present disclosure.

FIG. 4 is a diagram illustrating a system for transmitting advertisement content, according to an embodiment of the present disclosure. FIG. 4 is described with reference to the advertisement content transmission system 200 illustrated in FIG. 2.

An advertisement content transmission system 400 may include a display device 202, a blockchain network 204, an advertiser device 206, and a mining device 402.

In order to be a participant in the blockchain network 204, the display device 202 has to first download a copy of the blocks 302. The display device 202 may download a copy of the blocks 302 from an electronic device located closest to the display device 202 based on IP addresses, among the electronic devices on the blockchain network 204. Alternatively, the display device 202 may download a copy of blocks 302 from an independent server (not shown) that has a copy of blocks 302 but does not perform a substantial transaction. Also, the display device 202 may download a copy of the blocks 302 from any one of the electronic devices on the blockchain network 204. By being a participant in the blockchain network 204, the display device 202 may receive the advertisement content based on the plurality of smart contracts.

As illustrated in FIG. 4, one or more display devices 202, advertiser devices 206, and/or mining devices 402 may participate in the blockchain network 204. Thus, the blockchain network 204 may include a plurality of display devices, a plurality of mining devices, and a plurality of advertiser devices. The plurality of display devices, the plurality of mining devices, and the plurality of advertiser devices may be connected to each other in the blockchain network 204.

According to an embodiment of the present disclosure, the plurality of display devices, the plurality of mining devices, and the plurality of advertiser devices may have copies of the blocks 302 connected to each other in the form of a chain, by establishing a network without a third intermediary. For example, upon settlement of a new transaction, a specific mining device 402 may generate a new block based on transaction information, and append the new block to existing blocks. Thereafter, other mining devices in the blockchain network 204 may determine that the transaction is valid through consensus and validation procedures, and append, to the existing blocks, the new block generated by the mining device 402. The order in which the blocks 302 are broadcast on the blockchain network 204 is randomly determined, and another electronic device that has received the blocks 302 may also broadcast the blocks 302 to other electronic devices connected to the blockchain network 204.

According to another embodiment of the present disclosure, each of the plurality of display devices 202, the plurality of mining devices 402, and the plurality of advertiser devices 206 may perform a specific operation within the blockchain network 204 according to the smart contracts. For example, the advertiser device 206 may share the plurality of smart contracts corresponding to the plurality of advertisement content items in the form of a block. The display device 202 may obtain the advertisement content metadata based on the content viewing information and the smart contract, so as to determine advertisement content 404, and may broadcast, to all electronic devices connected to the blockchain network 204, record information indicating that the advertisement content 404 has been determined.

The mining device 402 may append a new block generated based on the record information to an existing block in the form of a chain by using a block generation technique, and broadcast, to other mining devices connected to the blockchain network 204, a signal indicating that the new block has been appended. Thereafter, upon receipt of a signal indicating that the new block has been appended according to the consensus and validation procedures, the display device 202 may receive the advertisement content 404 from the advertiser device 206 and reproduce the advertisement content 404, based on the obtained metadata.

Figure 5:
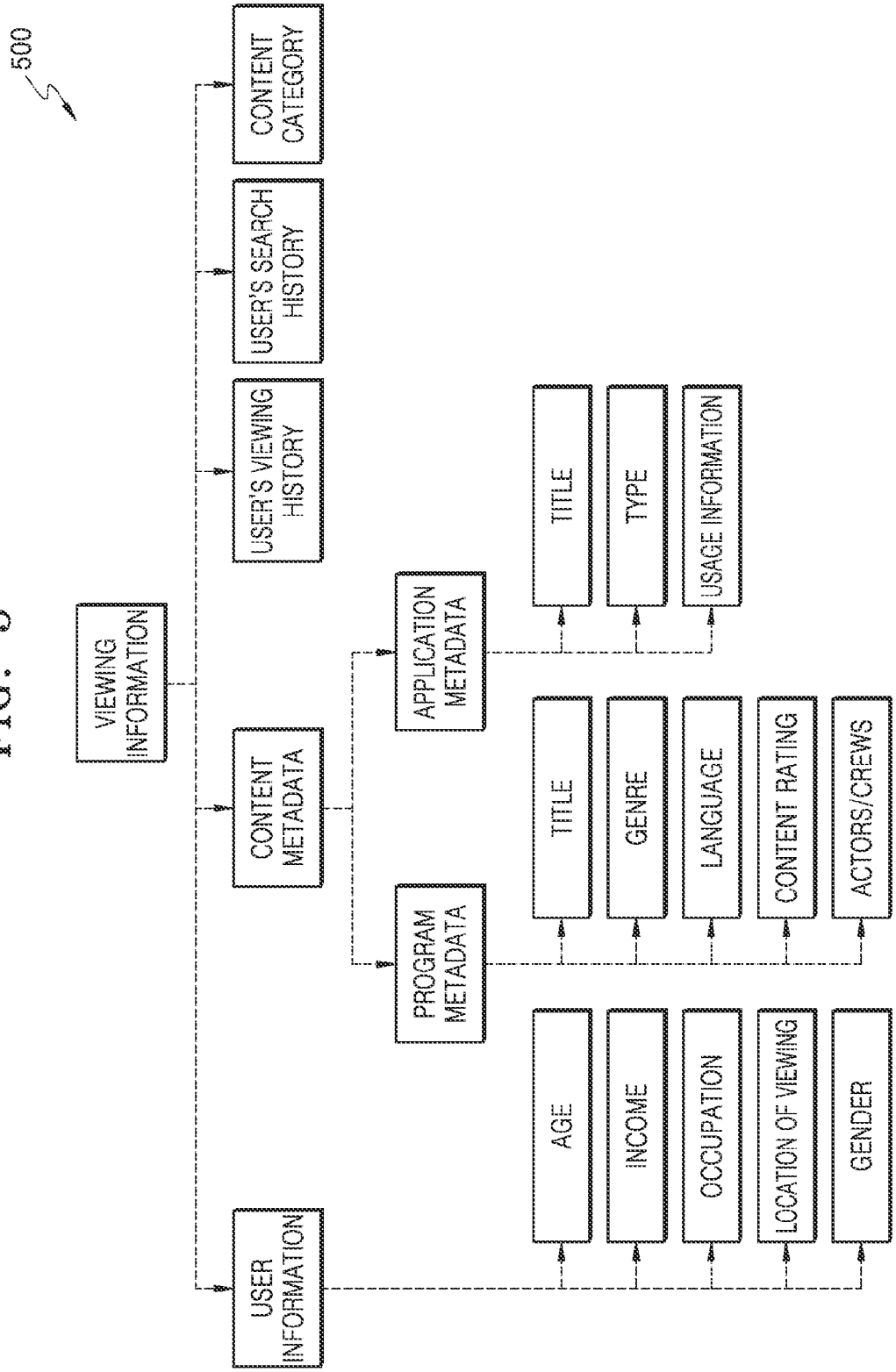
FIG. 5 is a diagram illustrating an example of viewing information, according to an embodiment of the present disclosure.

FIG. 5 is a diagram illustrating an example of viewing information, according to an embodiment of the present disclosure.

The viewing information may be generated by the display device 202 based on the content that the user is viewing.

As illustrated in FIG. 5, the viewing information may include at least one of information about the user viewing the content, metadata of the content, information about a user's search history and a user's viewing history related to the content, or information about a date of reproduction or a category of the content.

The information about the user viewing the content may include the age, income, occupation, and gender of the user viewing the content, geographical location where the content is being viewed, or the like.

The metadata of the content may be information about the content that the user is viewing, and may include program metadata and application metadata. In this case, the program metadata may include a title, a genre, a language, a content rating (age group), and actors/crews of the content being displayed on the display device 202. In addition, the application metadata may include a title, a type (e.g., a game, news), and usage information of an application being executed by the display device 202.

The information about the user's search history and the user's viewing history related to the content may include information about content items that the user has searched for and viewed for a preset period of time.

A content category may indicate the type of the content being displayed on the display device 202 and may further include a subcategory. For example:

TABLE 1

| Content category | Subcategory |
| --- | --- |
| Entertainment | Horror |
|  | Comedy |
|  | Live broadcast |
|  | Drama |
| Movie | Romance |
|  | Thriller |
|  | Action |
|  | Humanism |
| Music | Rock |
|  | Jazz |
|  | Hollywood |
|  | Ballad |
| News | Business |
|  | National news |
|  | International news |
|  | Local news |
| Study | Education |
|  | History |
|  | Geography |
|  | Culture |

According to an embodiment of the present disclosure, the content category may be determined to be "Sports" and the subcategory may be determined to be "Football" based on the content being currently viewed by the user, user's viewing history information about previously viewed content items, and user's search history information about previously searched content items. A mapping mechanism between the viewing information and the content category may be a rule-based engine or a data-based learning technique.

TABLE 2

| Current content | User's viewing history | User's search history | Content category |
| --- | --- | --- | --- |
| Title - WC Football 2018 Genre - Sports Language - English Content rating - Suitable for all ages | Source - Sports Channel Program - Soccer Shots Viewing duration - 40 minutes | App - XYZ App type - Sports | Content category: "Sports" Subcategory : "Football" |
|  | Source - Media App Program - Player Name Interview Viewing duration - 20 minutes | App - Browser Website - ABC |  |

Figure 6:
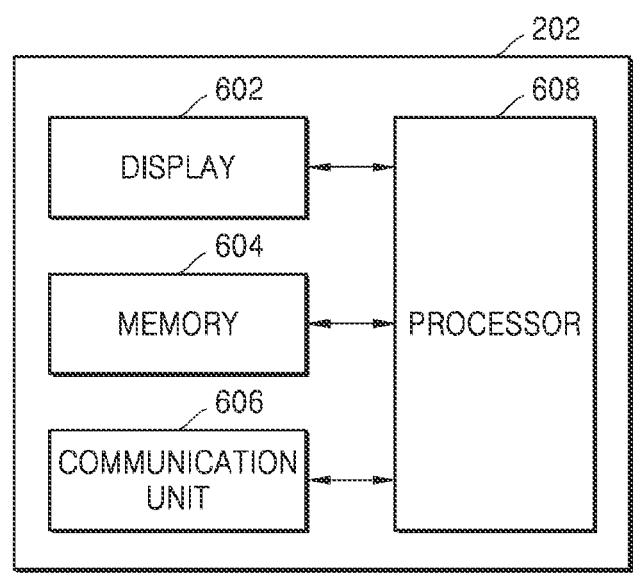
FIG. 6 is a block diagram of a display device, according to an embodiment of the present disclosure.

FIG. 6 is a block diagram of the display device 202, according to an embodiment of the present disclosure.

The display device 202 may include a display 602, a memory 604, and a communication unit 606.

According to an embodiment of the present disclosure, the display 602 may display, to the user, the content or the advertisement content transmitted to the display device 202. The display 602 may display, to the user, the content or the advertisement content received by the communication unit 606, according to a reproduction mode. The reproduction mode is a mode in which the content or the advertisement content is displayed to the user, and, according to the reproduction mode, the display device 202 may display the two content items on split screens, or may display the advertisement content on an external device of the display device 202.

According to an embodiment of the present disclosure, the memory 604 may be a local storage medium that can be used by the display device 202. The memory 604 may store the viewing information, the smart contract downloaded from the blockchain network 204, the advertisement content metadata, and other information such as the user's personal information. For example, important data such as the user's personal information may be stored in an encrypted format to maintain personal information and security. Also, the data stored in the memory 622 may be used to store a trained model for content recognition and category classification performed by the display device 202.

The memory 604 may be provided as a writable read-only memory (ROM), such that data remains even when power being supplied to the display device 202 is cut off, and modifications are reflected. That is, the memory 220 may be a flash memory, an erasable programmable read-only memory (EPROM) or an electrically erasable programmable read-only memory (EEPROM). In the present disclosure, for convenience of description, it is described that all of the viewing information, the smart contract, the advertisement content metadata, or the like are stored in a single memory 604, but the present disclosure is not limited thereto, and the display device 202 may include a plurality of memories.

According to an embodiment of the present disclosure, the communication unit 606 may download a copy of the blocks 302 to participate in the blockchain network 204, receive content to be viewed by the user from an external server (not shown) or from another electronic device on the blockchain network 204, and request the advertiser device 206 to transmit advertisement content based on the advertisement metadata. Further, the communication unit 606 may broadcast, to other electronic devices through the blockchain network 204, record information indicating that the advertisement content has been determined, and receive a signal indicating that a new block generated based on the record information has been appended to existing blocks in the form of a chain.

The communication unit 606 may include a wired/wireless communication network including a TCP/IP communication network. The wireless communication network may be, but is not limited to, a global system for mobile communications (GSM) network, an enhanced data GSM environment (EDGE) network, a wideband code division multiple access (WCDMA) network, a code division multiple access (CDMA) network, a time division multiple access (TDMA) network, or the like.

According to an embodiment of the present disclosure, the processor 608 may control all "units" such that the "units" of the present disclosure perform specific operations, and may perform, by itself, operations performed by the "units" of the present disclosure. In addition, if necessary, the processor 608 may receive information about the content from the display 602 and perform content recognition, and may modify the user's viewing information by interacting with the memory 604.

According to an embodiment of the present disclosure, the processor 608 may obtain the viewing information about the content, and obtain a plurality of smart contracts corresponding to a plurality of advertisement content items, respectively. Also, the processor 608 may determine advertisement content related to the content from among the plurality of advertisement content items based on the viewing information and the plurality of smart contracts, receive the determined advertisement content, and reproduce the received advertisement content.

According to an embodiment of the present disclosure, the processor 608 may control the communication unit 606 to broadcast the record information indicating that the advertisement content has been determined. Thereafter, upon receipt of the signal indicating that the new block generated based on the record information has been appended in the form of a chain, the processor 608 may receive the determined advertisement content based on the received signal.

According to an embodiment of the present disclosure, the processor 608 may provide the exposure data of the determined advertisement content to the advertiser device 206, and may receive information about tokens from the advertiser device 206 based on the exposure data of the advertisement content.

According to an embodiment of the present disclosure, when a predefined event is detected, the processor 608 may reproduce the received advertisement content. In addition, the processor 608 may control a first display 702 and a second display 704 such that the advertisement content is reproduced on the second display 704 while the content is displayed on the first display 702.

According to another embodiment of the present disclosure, the processor 608 may control the communication unit 606 to transmit, to the external device interworking with the display device 202, the advertisement content and information for controlling the reproduction of the advertisement content.

Figure 7:
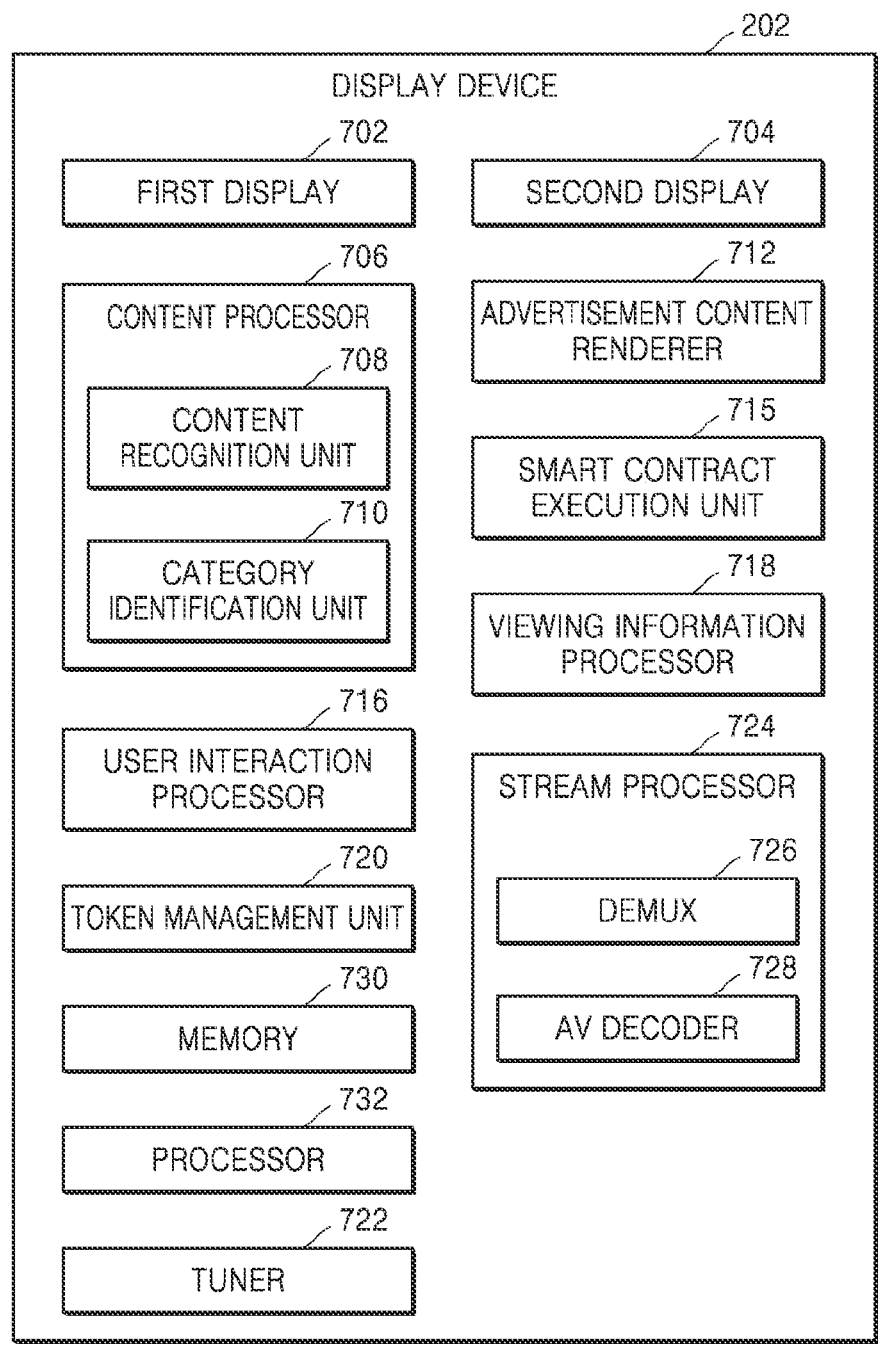
FIG. 7 is a block diagram of a display device, according to an embodiment of the present disclosure.

FIG. 7 is a block diagram of the display device 202, according to an embodiment of the present disclosure.

The display device 202 may include the first display 702, the second display 704, a content processor 706, an advertisement content renderer 712, a smart contract execution unit 714, a user interaction processor 716, a viewing information processor 718, a token management unit 720, a memory 604, a processor 608, a tuner 722, and a stream processor 724. The content processor 706 may include a content recognition unit 708 and a category identification unit 710. Also, the stream processor 724 may include a DEMUX 726 and an AV decoder 728. The memory 730 and the processor 732 of FIG. 7 correspond to the memory 604 and the processor 608 of FIG. 6, respectively, and thus descriptions thereof will be omitted.

According to an embodiment of the present disclosure, the first display 702 may be a hardware module for displaying content (e.g., programs, apps, games). The first display 702 and the second display 704 may be split screens on the display 602, and, according to the reproduction mode, the display device 202 may display the content and the advertisement content on the first display 702, or display the content on the first display 702 and display the advertisement content on the second display 704. In the present disclosure, the first display 702 may be a main display and the second display 704 may be an auxiliary display. Accordingly, the second display 704 may be distinguished from the first display 702, and may or may not operate according to the reproduction mode. For example, in a case where the reproduction mode of the advertisement content is a mode in which only one screen is used (or a mode in which the entire screen is used), the display device 202 may display the advertisement content on the first display 702. Although only two screens (the first display 702 and the second display 704) are illustrated in the present disclosure, the present disclosure is not limited thereto, and the display 602 may include two or more screens.

According to an embodiment of the present disclosure, the content may be displayed at a predefined position of the first display 702. While the content is displayed on the display 602, a frame of the content may be captured, and the viewing information may be transmitted to the content processor 706.

The content recognition unit 708 may recognize the content being displayed on the first display 702 by using the captured frame and a content recognition artificial intelligence (AI) algorithm. In addition, the content recognition unit 708 may recognize a program being reproduced by the display device 202, an application being executed by the display device 202, and information about the user's viewing history or information about a user's search history. The content recognition unit 708 may identify viewing-related data, and may share the identified data with the category identification unit 710.

Figure 8:
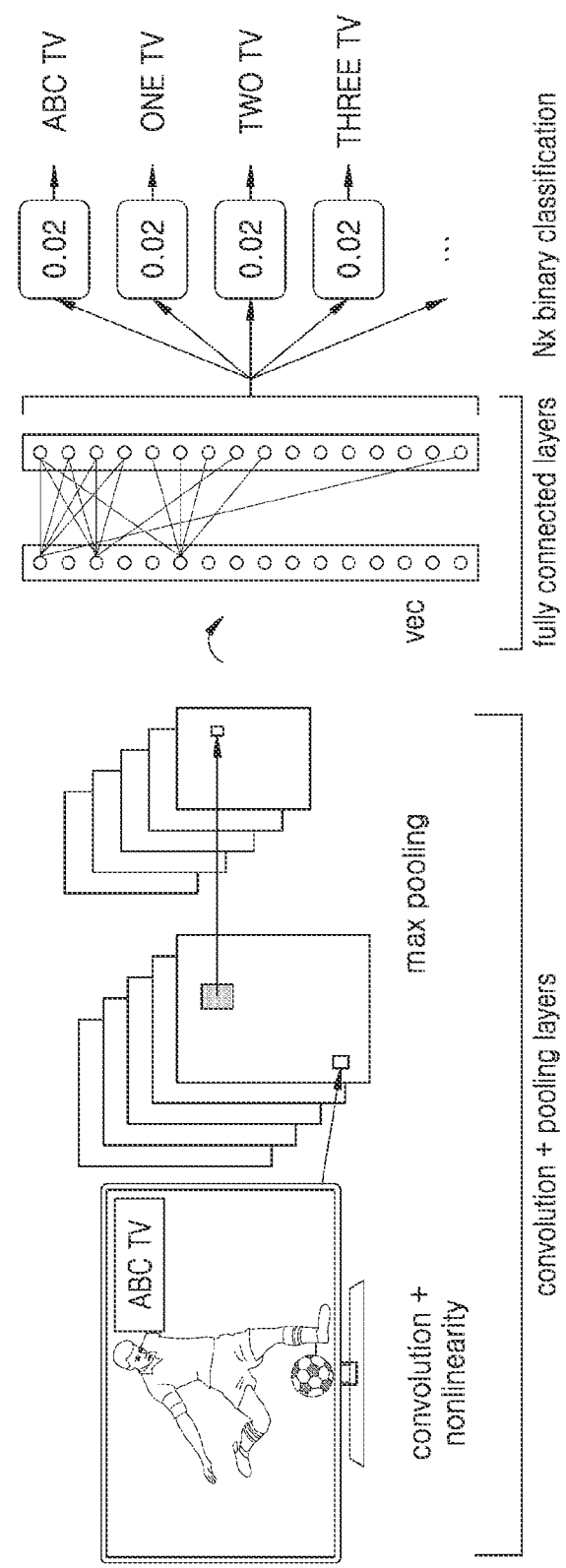
FIG. 8 is a diagram illustrating an example of recognizing content being displayed, according to an embodiment of the present disclosure.

FIG. 8 is a diagram illustrating an example of recognizing content being displayed, according to an embodiment of the present disclosure. Specifically, FIG. 8 illustrates an example of recognizing the content being viewed by the user based on a convolutional neural network (CNN). The CNN-based content recognition may be performed by the content recognition unit 708 identifying the content being displayed on the display device 202. The CNN-based content recognition may be a model trained on a plurality of frames with a plurality of logos of channels. Whenever an arbitrary frame is input to the trained model, the trained model may identify a channel by performing forward propagation. After the channel is identified, program details may be obtained from an electronic program guide (EPG) or a metadata server (not shown).

Referring back to FIG. 7, in order to recognize the content, the content recognition unit 708 may use an on-device content recognition AI algorithm that is pre-trained based on the information about the user's viewing history. Because the user's viewing information is stored in the display device 202, in an encrypted format, the display device 202 may provide the user with the advertisement content without compromising the privacy of the user. Also, the content recognition unit 708 may identify the genre of the content by using an AI algorithm, and, accordingly, may provide the user with advertisement content related to the genre of the content that the user is viewing. The genre identification refers to classification of the genres of content items that the user has viewed for a preset period of time, into genre categories, by applying a machine learning classification model that has been trained. Also, the content recognition unit 708 may identify the genre of the content that the user is viewing, by using a learning model that has been trained based on audio and video features of content items other than the content that the user is viewing. The genre identification performed by the content recognition unit 708 may be performed by classifying a stream into genres of several classes based on audio and video features of the content. In the present disclosure, although the content recognition unit 708 is described to identify the genre of the content, the present disclosure is not limited thereto, and the content recognition unit 708 may obtain not only the genre of the content but also other information (e.g., a language, the type of an object, a trademark) about the content by using an AI algorithm. Thereafter, the content recognition unit 708 may share, with the category identification unit 710, information obtained by the content recognition unit 708, information about the user viewing the content, the metadata of the content, the information about a user's search history and a user's viewing history related to the content, or the like.

The category identification unit 710 may identify the content category based on the information shared by the content recognition unit 708. The category identification unit 710 may be a rule-based engine, and the rule-based engine may filter text information from an input to match predefined words for content categories, with the text information. According to an embodiment of the present disclosure, the category identification unit 710 may determine the topic of the content based on an input by the content recognition unit 708, and the topic may serve a critical role in mapping to determine the content category and a subcategory. For example, in a case where the genre of the content identified by the content recognition unit 708 is "Entertainment", and the user has viewed "Comedy program" and has searched for the broadcasting time of the "Comedy program", the category identification unit 710 may determine that the topic of the content is "Broadcast program— Comedy program", thereby determining that the content category is "Entertainment" and the subcategory is "Comedy". Upon completion of the content recognition by the content recognition unit 706 and the category identification by the category identification unit 710, the content processor 706 may share, with the viewing information processor 718, content category information, the user's viewing history information, the user's search history information, and the content-related information obtained by the content recognition unit 708.

According to an embodiment of the present disclosure, the viewing information processor 718 may identify the user information of the user viewing the content. The user information may include the age, income, occupation, and gender of the user viewing the content, geographical location where the content is being viewed, or the like. The viewing information processor 718 may also generate the viewing information based on the user information and data shared by the content recognition unit 708 of the content processor 606. Thereafter, the advertisement content metadata may be obtained based on the viewing information and the advertisement content parameter, and thus the advertisement content may be determined.

According to an embodiment of the present disclosure, the smart contract execution unit 714 may receive the viewing information from the viewing information processor 718. Thereafter, the smart contract execution unit 714 may obtain specific advertisement content metadata based on the viewing information and the advertisement content parameter, according to the smart contract stored in the memory 604. The smart contract may be a computer protocol that facilitates, validates, or executes the settlement or execution of a transaction, and one smart contract may correspond to one advertisement content item. Accordingly, the viewing information may be an input for the smart contract, and the advertisement content may be determined by matching the viewing information with the advertisement content parameter in the smart contract. In this case, one or more smart contracts may exist, and thus one or more advertisement content items may be determined. In a case where a plurality of advertisement content items have been determined to be viewed, one or more advertisement content items may be displayed according to the reproduction mode. For example, in a case of the reproduction mode in which the advertisement content is displayed on a split screen, advertisement content having the highest matching level among the plurality of determined advertisement content items may be displayed. In addition, all of the plurality of determined advertisement content items may be displayed on a plurality of split screens, respectively.

The advertisement content may include the advertisement content metadata, and the advertisement content metadata to be obtained by the smart contract execution unit 714 may correspond to the advertisement content metadata in the blocks 302. The advertisement content metadata may include at least one of a reproduction duration of the advertisement content, a title, a language, a storage location (e.g., a URL address on the advertiser device 206), or a reproduction mode of the advertisement content. The storage location contained in the advertisement content metadata may correspond to an address at which the advertiser device 206 stores the determined advertisement content. Accordingly, the display device 202 may receive the advertisement content from the advertiser device 206 based on the storage location. Thereafter, upon receipt of the advertisement content, the smart contract execution unit 714 may transmit, to the advertisement content renderer 712, data for displaying the advertisement content on the first display 702 or the second display 704.

According to an embodiment of the present disclosure, the smart contract execution unit 714 may generate the exposure data of the advertisement content after reproducing the advertisement content. The exposure data may include at least one of the number of times the advertisement content is reproduced or the reproduction duration of the advertisement content. The smart contract may include a token payment policy, and when the exposure data of the advertisement content is transmitted to the advertiser device 206, based on a token payment policy, a token may be deposited into the user account. The user may manage the token by using an interface, and may spend the token to purchase a product related to the advertisement content on the advertiser's website.

According to an embodiment of the present disclosure, the advertisement content renderer 712 may be configured to display the advertisement content on the first display 702, the second display 704, or both. The advertisement content renderer 612 may establish a connection with an advertisement content stream, and render the advertisement content on the first display 702, the second display 704, or both.

According to an embodiment of the present disclosure, the user interaction processor 716 may process an interaction between the display device 202 and the user.

According to an embodiment of the present disclosure, the token management unit 720 may manage tokens that the user is currently holding. The token management unit 720 may manage the tokens in the user account of the advertiser device 206, also manage tokens that the user is currently holding in the device 202, and record changes in the amount of tokens made as the user views advertisement content.

According to an embodiment of the present disclosure, the tuner 722 may be hardware configured such that control signals generated by processor 608 are transmitted to the elements 702 to 728 of the display device 202.

According to an embodiment of the present disclosure, the stream processor 724 is hardware including an Audio- Video (AV) decoder 632 and a Demultiplexer (DEMUX) 726 configured to support processing and transmission of a plurality of video services with a high resolution. The stream processor 724 may automatically readjust a stream of the advertisement content so as to provide an uninterrupted service.

Figure 9:
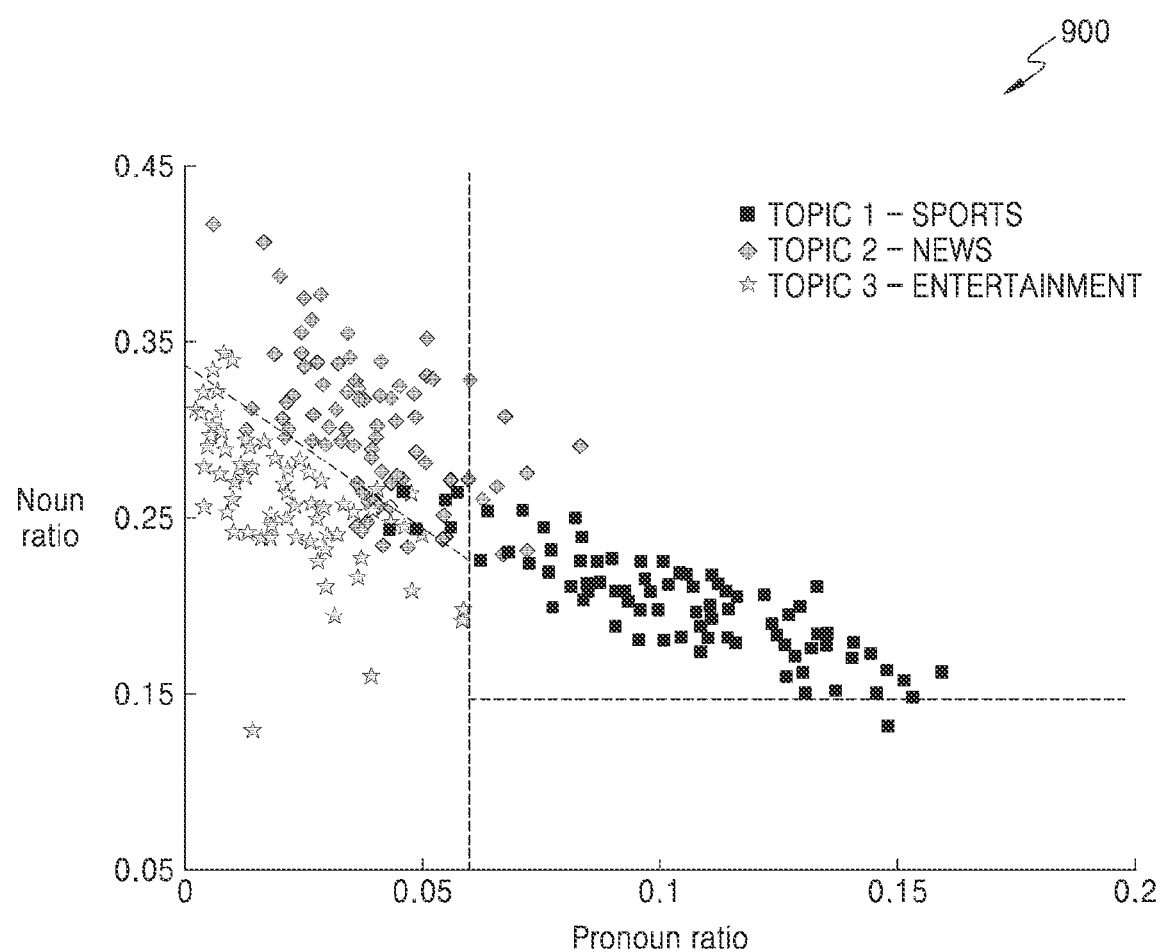
FIG. 9 is a schematic representation of latent Dirichlet allocation (LDA)-based topic modeling, according to an embodiment of the present disclosure.

FIG. 9 is a schematic representation of latent Dirichlet allocation (LDA)-based topic modeling, according to an embodiment of the present disclosure.

The category identification unit 710 may implement latent Dirichlet allocation (LDA)-based topic modeling to identify the viewing category and the subcategory. Topic modeling is a method of analyzing words in several documents and applying the analysis to a statistical model for analyzing a document to discover the topic of the document. There are various approaches to performing topic modeling, and the present disclosure uses LDA that is one of them. A graph 900 illustrates the LDA-based topic modeling performed on content items related to sports, news, and entertainment, that have been viewed by the user.

The LDA which is one of topic modeling approaches is a generative probabilistic model using Bayesian inference, and, in the LDA, a document is considered as a mixture of topics, in which the topics are represented by a probability distribution of words related to the topics. In other words, assuming that a write writes a document with a specific topic by stochastically selecting the specific topic and words related to the topic, by using the distribution of words in a plurality of document groups, the topic of a document may be inferred, and calculation of the similarity between documents or classification of documents may be efficiently and accurately performed. In an inference procedure, a vibrational expectation-maximization algorithm or Markov chain Monte Carlo Gibbs sampling may be used. By applying the LDA to vectorized data such as texts, images, or user behavior patterns, topics related to the data may be inferred.

The LDA is a generative probabilistic model for generating document groups. It is assumed that documents are represented as topics that are arbitrary probabilistic mixture models that are generated stochastically, and each topic is modeled to be represented by a probability distribution of words. Because the generative model performs three hierarchical Bayesian inference processes, the topic is represented as a Dirichlet distribution which is a special conjugate prior probability characteristic. Therefore, the existing complicated calculation process may be simplified by using a known Dirichlet distribution.

Figure 10:
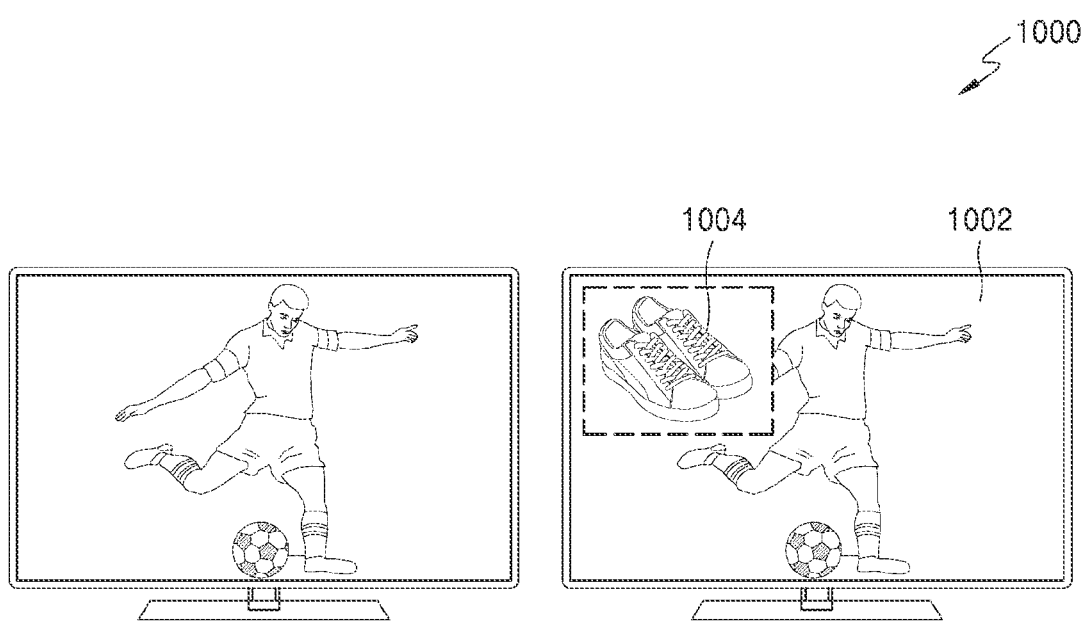
FIG. 10 is a diagram illustrating an example of displaying content on a display, according to an embodiment of the present disclosure.

FIG. 10 is a diagram illustrating an example of displaying content on the display 602, according to an embodiment of the present disclosure. The display 602 may be split into a first display 1002 and a second display 904.

The display device 202 may determine displays on which the content and the advertisement content are to be reproduced, respectively, according to the reproduction mode. As illustrated in FIG. 10, the advertisement content may be displayed on the second display 1004 while the content being viewed by the user is displayed on the first display 1002, according to the reproduction mode. In this case, the second display 1004 may be located at one of four corners of the first display 1002. In addition, the second display 1004 may be an overlay display or a picture-in-picture display.

Figure 11:
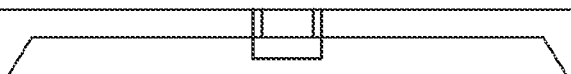
FIG. 11 is a diagram illustrating a user interface of a display device, according to an embodiment of the present disclosure.

FIG. 11 is a diagram illustrating a user interface 1100 of the display device 202, according to an embodiment of the present disclosure.

The user may check, through the user interface 1100, advertisers who transmit advertisement content items to the user, the categories of the advertisement content items, the number of times the advertisement content items have been viewed, and the viewing duration. Also, the user may interact with the display device 202 through the user interface 1100. For example, the user may add Advertiser-1 to a blacklist so as not to receive any further advertisement content from Advertiser-1.

Figure 12:
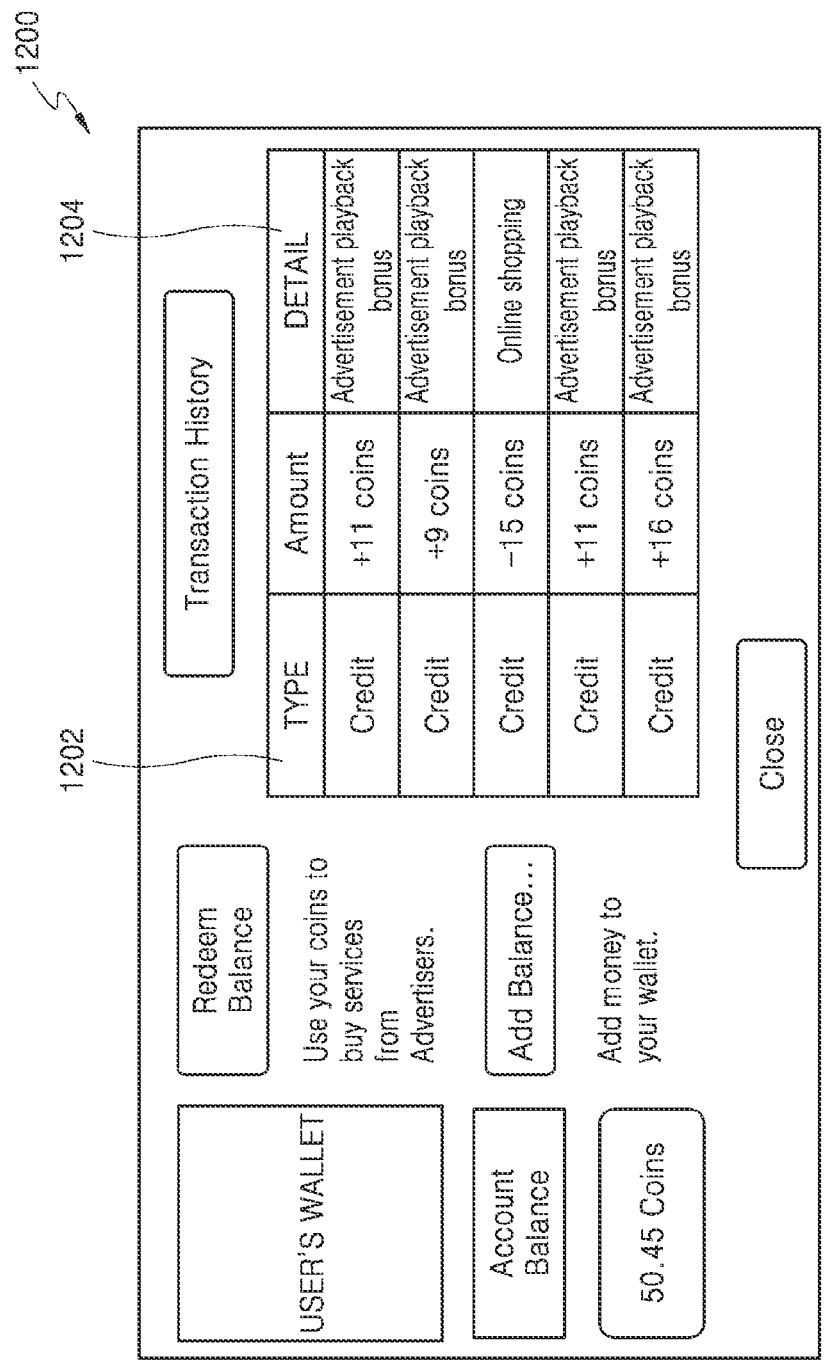
FIG. 12 is a diagram illustrating a user interface for managing tokens, according to an embodiment of the present disclosure.

FIG. 12 is a diagram illustrating a user interface 1200 for managing tokens, according to an embodiment of the present disclosure.

According to an embodiment of the present disclosure, the token management unit 720 may transmit and receive information about the user's tokens in the user account of the advertiser device 206. The token management unit 720 may receive all information about the user's tokens in user accounts in the plurality of advertiser devices 206, and individually manage the received information. In this case, the token deposited by the advertisers may have been provided as rewards for advertisement content items that the user has viewed. In addition, in order to execute a transaction on the blockchain network 204, the display device 202 may request to spend a token, and, upon the execution of the transaction, a preset amount of tokens may be withdrawn from the user account under the management by the token management unit 720. For example, the user may view advertisement content that is broadcast by a certain advertiser, and the advertiser may deposit a preset amount of tokens into the user account of the advertiser device 206, as a reward for viewing the advertisement content. Thereafter, the user may spend the deposited tokens to purchase a product sold by the advertiser who deposited the tokens, and may also purchase tokens through a payment procedure.

According to an embodiment of the present disclosure, the user interface 1200 for managing tokens may indicate a current token state of the user corresponding to Advertiser-1. As shown in FIG. 12, the user may check increases and decreases in the tokens through a 'Type' column 1202, and may also check their details through a 'Detail' column 1204. For example, the user may check, through the 'Type' column 1202 and the 'Detail' column 1204 in the first row, that 11 tokens has been deposited as a reward for viewing advertisement content.

In the present disclosure, the token management unit 720 may generate a plurality of public keys required to perform a transaction on the blockchain network 620, and the display device 202 may interact with the advertiser device 206 on the blockchain network 204 by using the public key instead of the IP address of the display device 202. The public key is composed of alphanumeric characters, and does not match privacy information such as an IP address, a MAC address, or a location. Accordingly, other electronic devices in the blockchain network 204 cannot retrieve information about the display device 202 through the blockchain network 204. This provides privacy of the display device 202 in the blockchain network 204.

Figure 13:
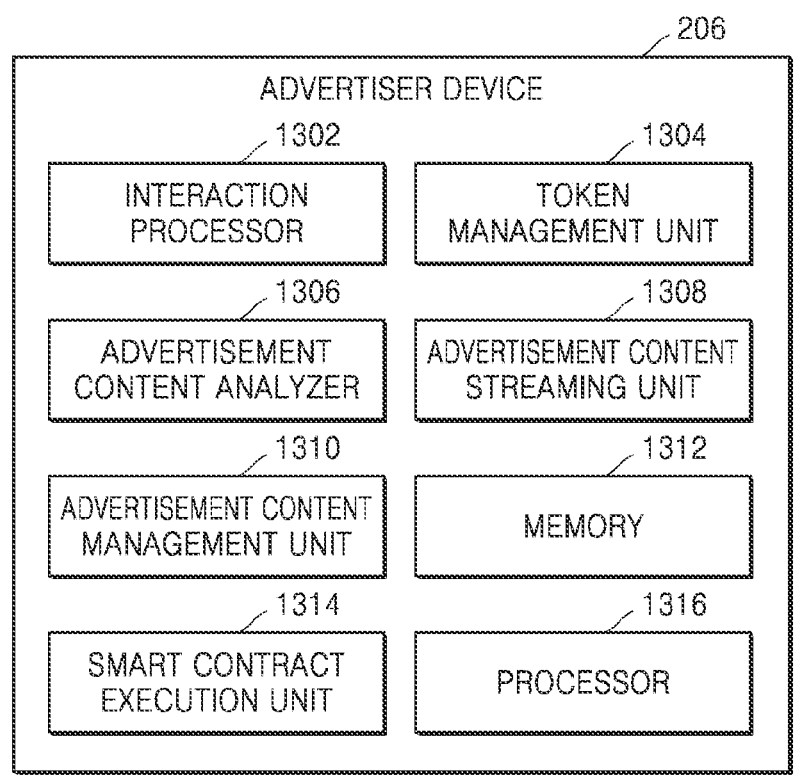
FIG. 13 is a block diagram of an advertiser device, according to an embodiment of the present disclosure.

FIG. 13 is a block diagram of the advertiser device 206, according to an embodiment of the present disclosure.

The advertiser device 206 may include an interaction processor 1302, a token management unit 1304, an advertisement content analyzer 1306, an advertisement content streaming unit 1308, an advertisement content management unit 1310, a memory 1312, a smart contract execution unit 1314, and a processor 1316.

According to an embodiment of the present disclosure, the advertiser device 206 may easily select the advertisement content to be viewed by the user, by using the interaction processor 1302. Specifically, the interaction processor 1302 may receive the viewing information of the content that the user is viewing, and generate the metadata of the advertisement content to be broadcast by the advertiser device 206. Accordingly, the advertiser device 206 may generate the advertisement content metadata including information about the user who will view the specific advertisement content, information about the reproduction duration of the advertisement content, advertiser information, or the like, by using the interaction processor 1302. The generated advertisement content metadata may be transmitted to the advertisement content management unit 1310 for additional processing, before being recorded in the smart contract.

According to an embodiment of the present disclosure, the advertisement content management unit 1310 may manage various types of advertisement content that may be displayed on the display 602. The advertisement content management unit 1310 may determine which advertisement content needs to be rendered from among a pool of viewable advertisement content items, based on the viewing information and the advertisement metadata received from the interaction processor 1302. Accordingly, the advertisement content management unit 1310 may determine a plurality of pieces of advertisement content metadata corresponding to the plurality of advertisement content items, respectively, based on the viewing information, and may transmit the advertisement content metadata to the smart contract execution unit 1314, for recording. Also, the advertisement content management unit 1310 may determine a ranking of advertisement content items that have been broadcast for a preset period of time, and transmit metadata of the highest-ranked advertisement content to the smart contract execution unit 1314.

According to an embodiment of the present disclosure, the smart contract execution unit 1314 may record the plurality of pieces of advertisement content metadata in the smart contract, and broadcast the smart contract on the blockchain network 204. In this case, the plurality of pieces of advertisement content metadata may be recorded in one smart contract, or each of the plurality of pieces of advertisement content metadata may be recorded in a corresponding one of the plurality of smart contracts. Also, the smart contract execution unit 1314 may execute the smart contract existing in a copy of a blockchain stored in the memory 1312. For example, in a case where the user views specific advertisement content, the smart contract execution unit 1314 may execute the smart contract so as to deposit a preset amount of tokens into the user account, and transmit, to the token management unit 1304, data indicating that the condition of the smart contract is satisfied.

According to an embodiment of the present disclosure, the advertisement content streaming unit 1308 may process a streaming data request for the advertisement content, received from the display device 202. In this case, the streaming data may be advertisement stream content, and, upon receipt of the streaming data request, the advertisement content stored in the memory 1312 may be transmitted to the display device 202. Also, the advertisement content streaming unit 1308 may transmit, to the smart contract execution unit 1314, data indicating that the specific advertisement content has been transmitted to the display device 202. The advertisement content streaming unit 1208 may be an essential part of the advertiser device 206 or may be a separate streaming server.

According to an embodiment of the present disclosure, the token management unit 1304 may manage tokens in an advertiser account and tokens deposited in the user account of the advertiser device 206. For example, when the user views the advertisement content of the advertiser, the token management unit 1304 may withdraw a preset amount of tokens from the advertiser account, and deposit the preset amount of tokens into the user account. In this case, the tokens from the advertiser account may be interchangeably used on the blockchain network 204, and may be spent to purchase a product sold by the advertiser.

The token management unit 1304 may generate a plurality of public keys required to perform a transaction on the blockchain network 620, and the advertiser device 206 may interact with the display device 202 on the blockchain network 204 by using the public key instead of the IP address of the advertiser device 206.

According to an embodiment of the present disclosure, the advertisement content analyzer 1306 may generate, with respect to all channels, predictive information that is advantageous for marketing, based on information about content items that users of the display devices 202 connected to the blockchain network 204 are viewing, content preferences, details of products that have been sold according to viewed advertisement content items, or the like. Thereafter, the predictive information generated by the advertisement content analyzer 1306 may be transmitted to the advertisement content management unit 1310 to be used to correspond specific viewing information to specific advertisement content metadata.

According to an embodiment of the present disclosure, the memory 1312 may store the viewing information, the advertisement content metadata, a copy of the blockchain, or the like, and the processor 1316 may control each of the elements 1302 to 1314 of the advertiser device 206 to perform a specific operation.

FIG. 14 is a diagram illustrating an advertiser interface 1400 in the advertiser device 206, according to an embodiment of the present disclosure. The advertiser may control a series of operations related to the advertiser device 206 through the advertiser interface 1400. For example, by using the advertiser interface 1400, the advertiser may determine which features in the viewing information are to be considered in the generation of the advertisement content metadata. In a case where the advertiser has determined to consider only the user's age, gender, and hobby, the advertiser device 206 may determine the advertisement content metadata to be recorded in the smart contract, based on only the user's age, gender, and hobby among the features in the viewing information received from the display device 202.

Figure 15:
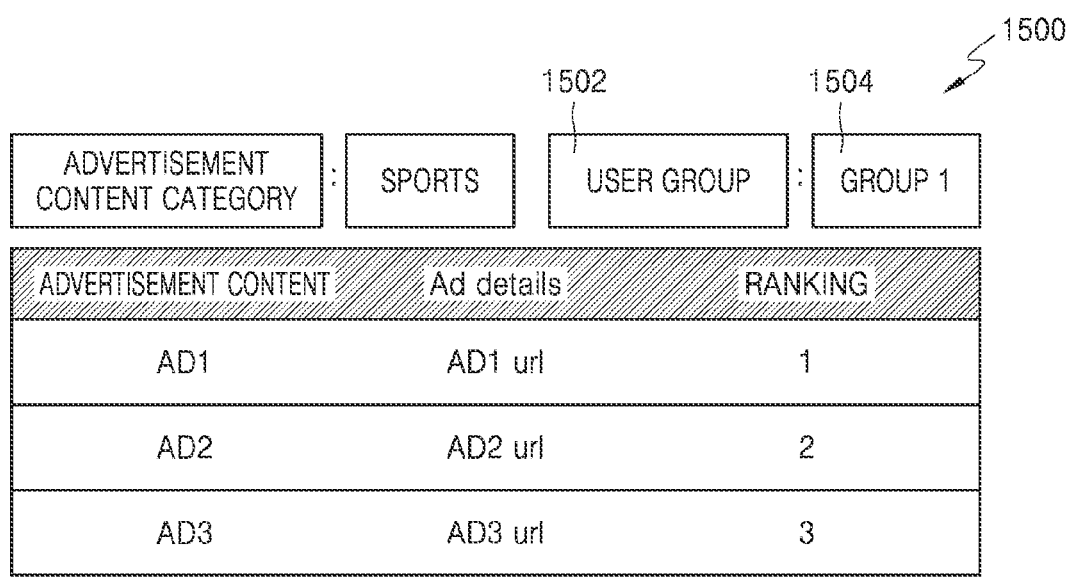
FIG. 15 is a diagram illustrating a ranking of viewed advertisement content items, according to an embodiment of the present disclosure.

FIG. 15 is a diagram illustrating a ranking 1500 of viewed advertisement content items, according to an embodiment of the present disclosure.

The advertiser may check the ranking 1500 of advertisement content items viewed by the users by using the advertiser interface 1400. Specifically, the advertiser may check the ranking 1500 of the advertisement content items, in which a plurality of advertisement content items that belong to a specific category are ranked based on the number of users in a user group 1502, who have viewed each of the plurality of advertisement content items. Here, the user group 1502 may be a group of users targeted by the advertiser, and may be predefined by the advertiser or may be adaptively determined while the advertisement content is streamed. For example, the advertiser may use the advertiser interface 1400 to group, into Group 1 1504, female users who are in their 30's and have an annual income of about $50,000 or more.

Figure 16:
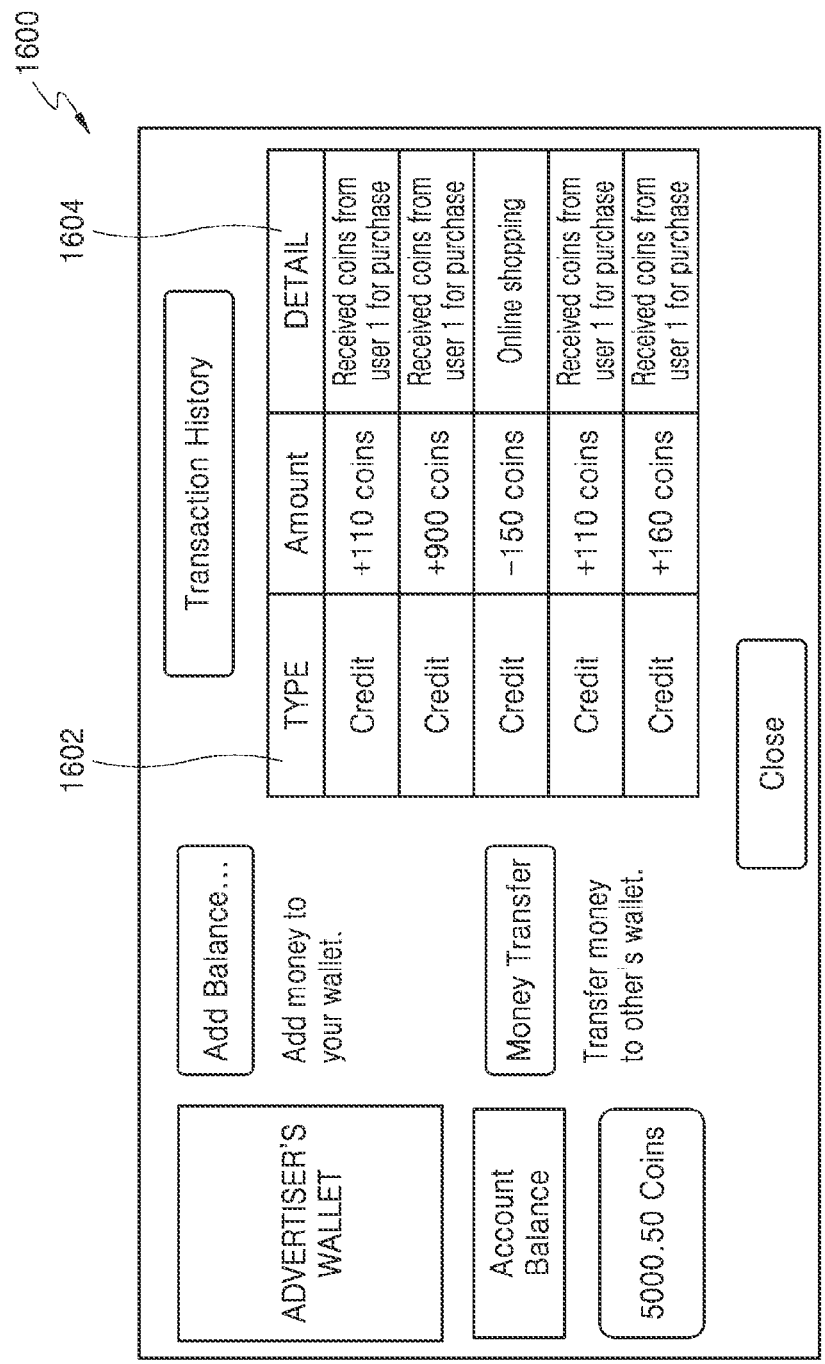
FIG. 16 is a diagram illustrating an advertiser interface for managing tokens of an advertiser device, according to an embodiment of the present disclosure.

FIG. 16 is a diagram illustrating an advertiser interface 1600 for managing tokens of the advertiser device 206, according to an embodiment of the present disclosure.

According to an embodiment of the present disclosure, the token management unit 1304 may manage tokens in the advertiser account of the advertiser device 206 and tokens deposited in the user account. Accordingly, when the user views specific advertisement content, the token management unit 1304 may deposit, into the user account, a preset amount of tokens withdrawn from the advertiser account. On the contrary, when the user purchases a product sold by the advertiser by using a preset amount of tokens of the user account, the token management unit 1304 may deposit, into the advertiser account, the preset amount of tokens withdrawn from the user account.

According to an embodiment of the present disclosure, the advertiser interface 1600 for managing tokens may indicate a current token state of the advertiser corresponding to Advertiser-1. As shown in FIG. 16, the user may check increases and decreases in the tokens through a 'Type' column 1602, and may also check their details through a 'Detail' column 1604. For example, the advertiser may check, through the 'Type' column 1602 and the 'Detail' column 1604 in the first row, that 110 tokens has been deposited as a user has purchased a product.

Figure 17:
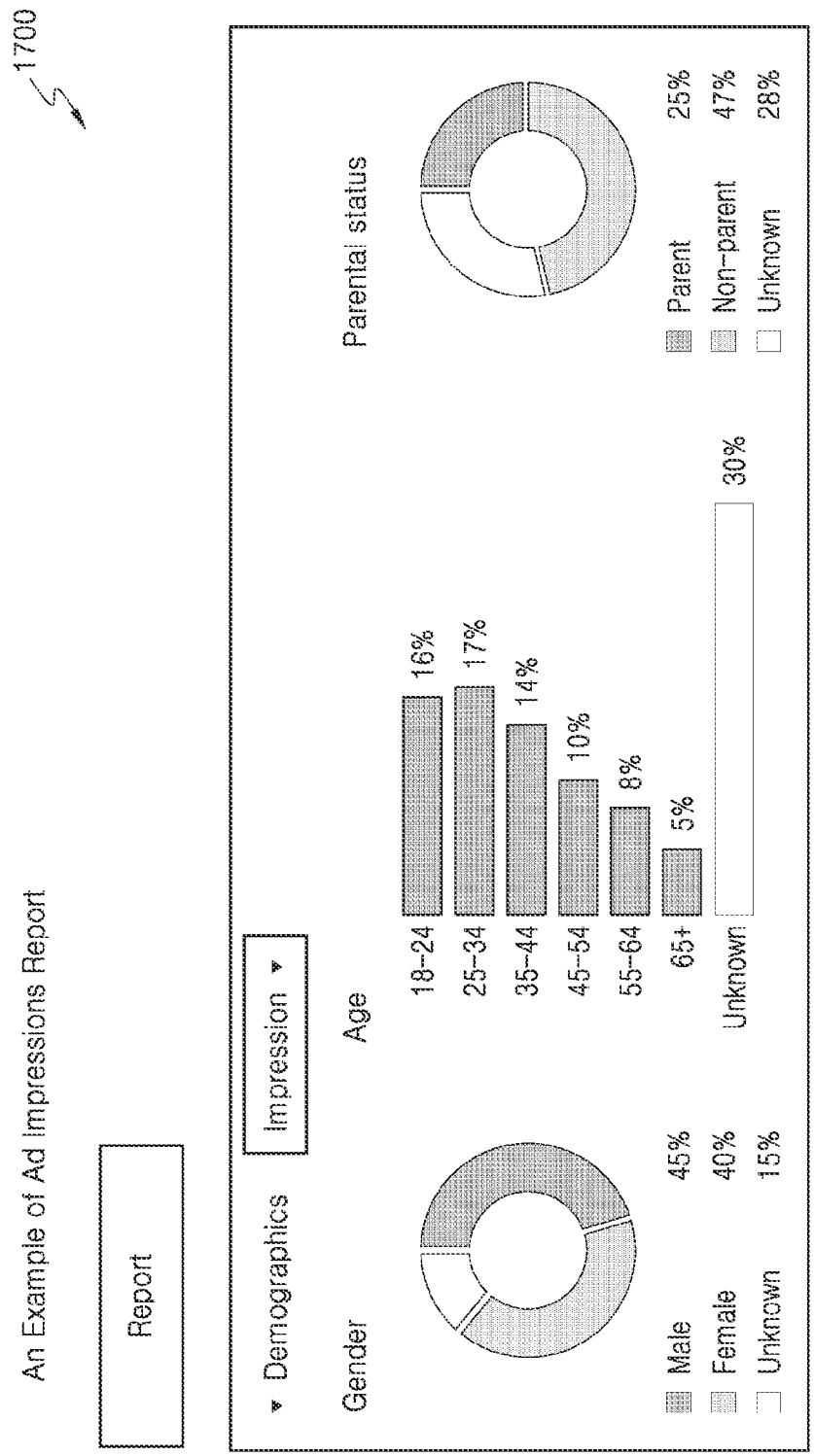
FIG. 17 is a diagram illustrating an example of a report, according to an embodiment of the present disclosure.

FIG. 17 is a diagram illustrating an example of a report 1700, according to an embodiment of the present disclosure.

As shown in FIG. 17, the advertisement content analyzer 1306 of the advertiser device 206 may generate the report 1700 on statistical information of users who have viewed specific advertisement content. The advertiser may read the report 1700 through the advertiser interface 1400, and the report 1700 may be transmitted to the advertisement content management unit 1310 to be used to correspond specific viewing information to specific advertisement content metadata.

Figure 18:
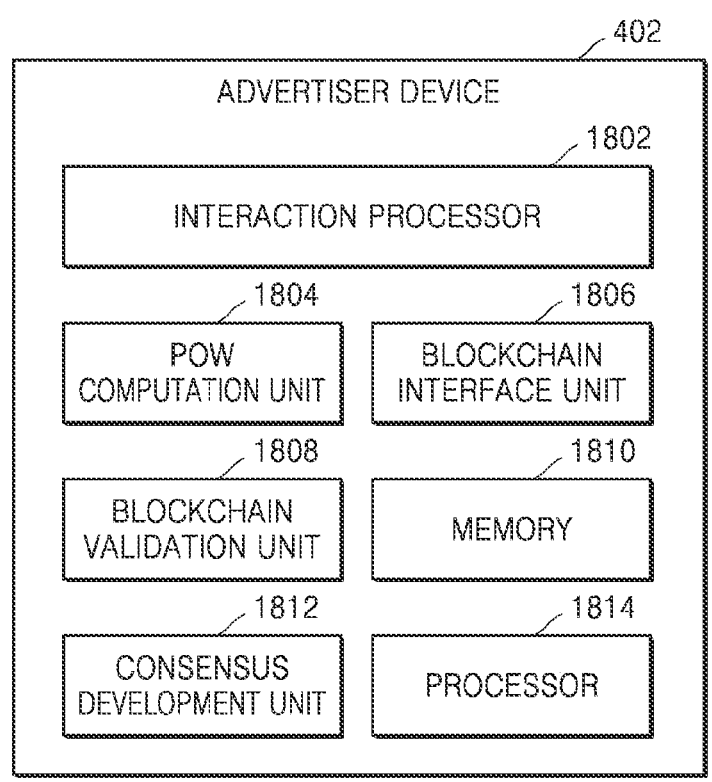
FIG. 18 is a block diagram of a mining device, according to an embodiment of the present disclosure.

FIG. 18 is a block diagram of a mining device 402, according to an embodiment of the present disclosure.

According to an embodiment of the present disclosure, the mining device 402 may include an interaction processor 1802, a POW computation unit 1804, a blockchain interface unit 1806, a blockchain validation unit 1808, a memory 1810, a consensus development unit 1812, and a processor 1814.

In the present disclosure, mining is a process executed by a processor(s), to iteratively attempt to compute a secure hash algorithm (SHA)-256 hash of the header of a block that begins with a plurality of zeros. The mining device 402 that has successfully computed, prior to any other mining devices, the hash as a valid proof-of-work, with respect to a block candidate, may be entitled to append the block candidate as a block for the corresponding blockchain, and an account linked to the mining device 402 may receive a preset amount of tokens (or Bitcoin or other cryptocurrency) as a reward. A proof-of-work for a block consists of a nonce that, when inserted into a designated field in the block, causes a cryptographic hash value of the block to reach a specific difficulty target. Because a cryptographic hash function functions practically as a random oracle, no better approach to finding a valid nonce has yet been discovered than simple trial-and-error. The mining process is therefore a stochastic process. In practice, the chances of a particular miner successfully solving a block are, at any particular point in time, proportional to the miner's hash rate relative to the hash rate of the whole network.

In the present disclosure, a validation process is to verify the validity of a generated block, and, when a majority of mining devices connected to the blockchain network have verified that the generated block is valid, and thus consensus has been reached, the electronic devices connected to the blockchain network may append the generated block to the blockchain that each of the electronic devices locally stores.

According to an embodiment of the present disclosure, in a case where the display device 202 has broadcast the record information indicating that the advertisement content has been determined, the mining device 402 may compute a hash to generate a new block based on the record information. Thereafter, when a specific mining device 402 has generated a block, the specific mining device 402 may broadcast information about the computed hash, to a plurality of other mining devices connected to the blockchain network 204, for a consensus procedure for validating the generated block.

According to an embodiment of the present disclosure, the interaction processor 1802 may manage data transmission between the elements 1804, 1806, 1808, 1810, 1812, and 1814 in the mining device 402, receive the record information indicating that specific advertisement content has been determined, and transmit the record information to the POW computation unit 1804.

The POW computation unit 1804 may compute the hash for the proof-of-work for generating a block, based on the record information indicating that the specific advertisement content has been determined. Specifically, the proof-of-work may be a process of finding a hash value by computing a secure hash algorithm (SHA)-256 hash of the header of a block. Thus, after the hash value is found, the POW computation unit 1804 may transmit a consensus and validation request to other mining devices in the blockchain network 204.

According to an embodiment of the present disclosure, the blockchain interface unit 1806 may connect the mining device 402 to other mining devices in the blockchain network 204. Accordingly, the blockchain validation unit 1808 and the consensus development unit 1812 may use the blockchain interface unit 1806 for data transmission to other mining devices.

According to an embodiment of the present disclosure, after the POW computation unit 1804 has generated a new block as a proof-of-work, the consensus development unit 1812 may broadcast the block having the computed hash value, to other mining devices in the blockchain network 204 through the blockchain interface 1806, for the consensus procedure.

According to an embodiment of the present disclosure, in a case where another mining device in the blockchain network 204 has generated a new block by computing a hash, and the mining device 402 has received the block having the computed hash value, the blockchain validation unit 1808 may confirm the validity of the block by substituting the computed hash value into a predefined algorithm, for example, a secure hash algorithm (SHA)-256. In the present disclosure, the predefined algorithm used to verify the validity of a block may be various validation algorithms or may be various irreversible algorithms. In a case where the newly generated block is verified to be valid, the consensus blockchain validation unit 1808 may broadcast a signal indicating that the validation is completed to all electronic devices in the blockchain network 204, and the mining device 402 may append the newly generated block to the stored blockchain in the form of a chain.

According to an embodiment of the present disclosure, the memory 1810 may store the smart contract, a copy of the blockchain, or the like, and the processor 1814 may control each of the elements 1802 to 1812 of mining device 402 to perform a specific operation.

Figure 19:
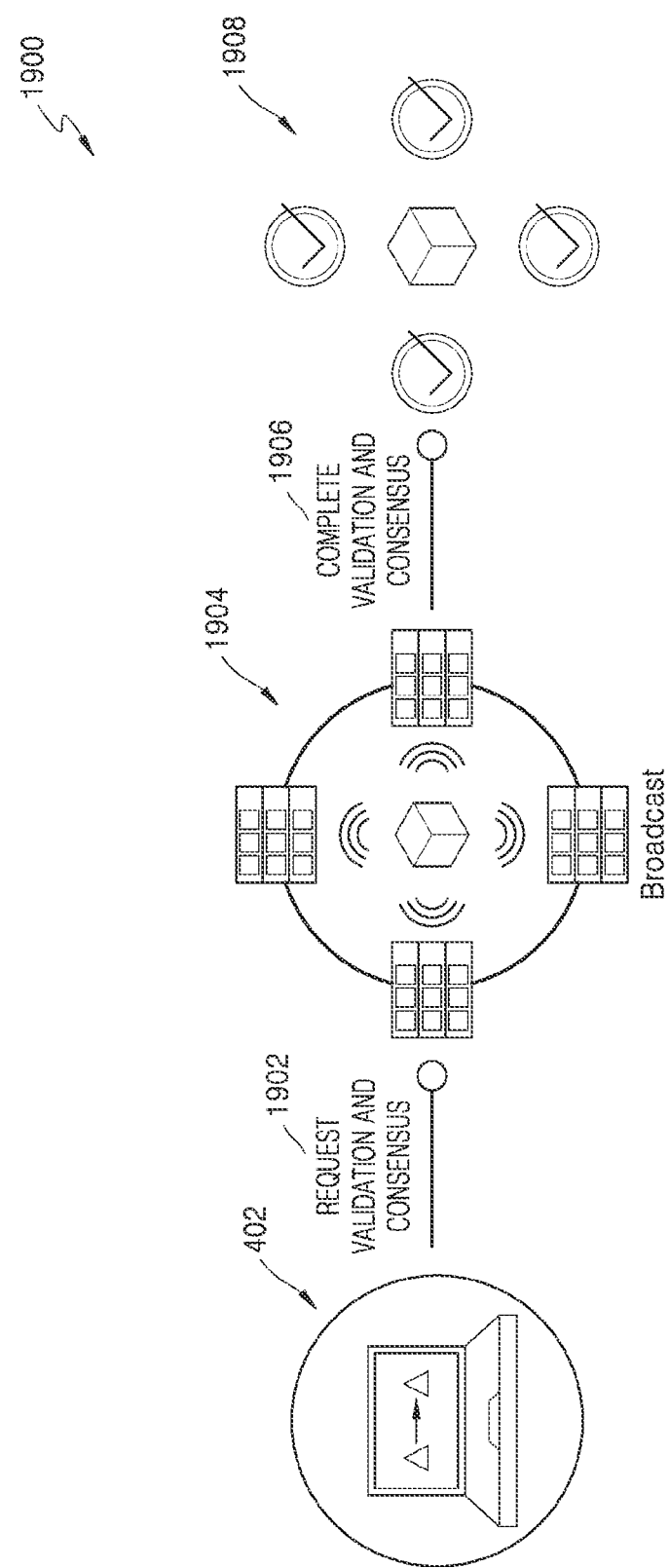
FIG. 19 is a diagram illustrating a blockchain validation process, according to an embodiment of the present disclosure.

FIG. 19 is a diagram illustrating a blockchain validation process 1900, according to an embodiment of the present disclosure.

After the mining device 402 has computed the hash value as a proof-of-work, the mining device 402 may send a validation and consensus request 1902 to other mining devices 1904 in the blockchain network 204 with the new block having the computed hash value. Thereafter, upon completion of the validation and consensus (1906), each of all electronic devices 1908 in the blockchain network 204 may store the same blockchain in which the new block has been appended in the form of a chain.

Figure 20:
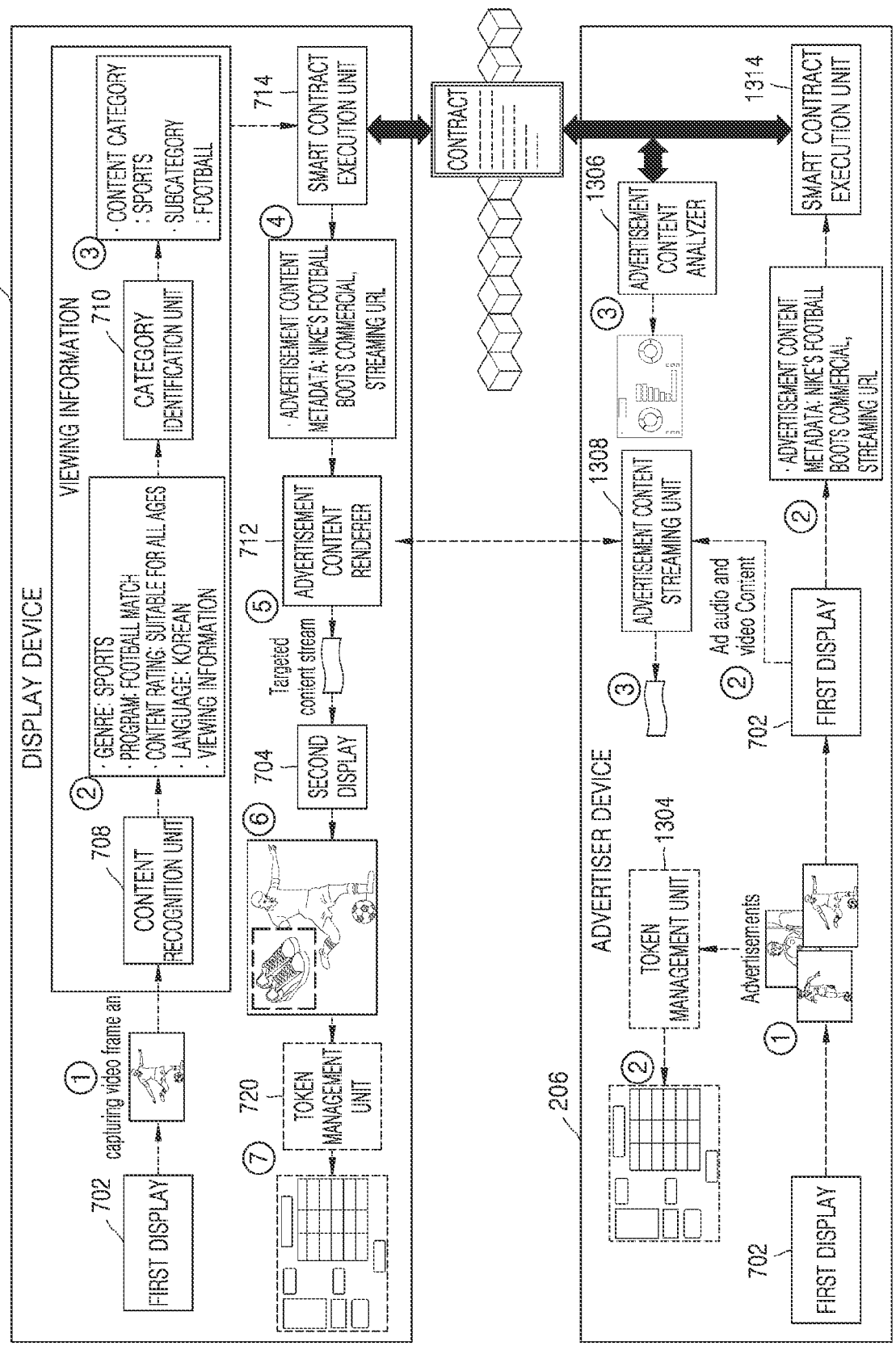
FIG. 20 is a diagram illustrating a method of transmitting advertisement content, according to an embodiment of the present disclosure.

FIG. 20 is a diagram illustrating a method of transmitting advertisement content, according to an embodiment of the present disclosure.

To describe the transmission of the advertisement content from the viewpoint of the display device 202, the display device 202 may display the content (e.g., a sport game) on the first display 702. The content recognition unit 708 may determine the genre of the content by analyzing the content being displayed, by using an AI algorithm, and may identify user information and program metadata. The content recognition unit 708 may also identify viewing-related data and share the identified data with the category identification unit 710, so as to identify the category of the content. Thereafter, the category identification unit 710 may identify the content category based on the information shared by the content recognition unit 708. After the viewing information is generated, the smart contract execution unit 714 may input the viewing information as an input for the plurality of smart contracts, obtain the advertisement content metadata by matching the viewing information with the advertisement content parameter in the smart contract, and then determine the advertisement content that the user may view. Each of the plurality of smart contracts may correspond to each of the plurality of advertisement content items, and may include advertisement content metadata. In this case, the advertisement content metadata obtained by the smart contract execution unit 714 may be data that the advertiser device 206 has included in the smart contract in the form of a blockchain on the blockchain network 204. After the advertisement content is determined, the advertisement content renderer 712 may receive the advertisement content from the advertiser device 206 based on the advertisement content metadata, and transmit the advertisement content to the second display 704. Thereafter, the second display 704 may display the advertisement content, and the token management unit 720 may manage a preset amount of tokens obtained as a reward for the advertisement content that the user has viewed.

To describe the transmission of the advertisement content from the viewpoint of the advertiser device 206, the interaction processor 1302 may receive the viewing information of the content that the user is viewing, and generate, in advance, the metadata of the advertisement content to be broadcast by the advertiser device 206. When the user views the advertisement content of the advertiser, the token management unit 1304 may manage the tokens in the advertiser account of the advertiser device 206 and the tokens deposited in the user account. The advertisement content management unit 1310 may determine which advertisement content needs to be rendered with respect to specific viewing information, by corresponding the viewing information received from the interaction processor 1302 to the plurality of pieces of advertisement metadata. The smart contract execution unit 1314 may record the plurality of pieces of advertisement content metadata in the smart contract, and broadcast the smart contract on the blockchain network 204. Thereafter, when the user views the specific advertisement content, the advertisement content analyzer 1306 may generate predictive information that is advantageous for marketing, based on a history of details of product purchases related to the viewing of the advertisement content. Upon receipt of a streaming data request from the display device 202, the advertisement content streaming unit 1308 may transmit, to the display device 202, the advertisement content stored in the memory 1312.

Figure 21:
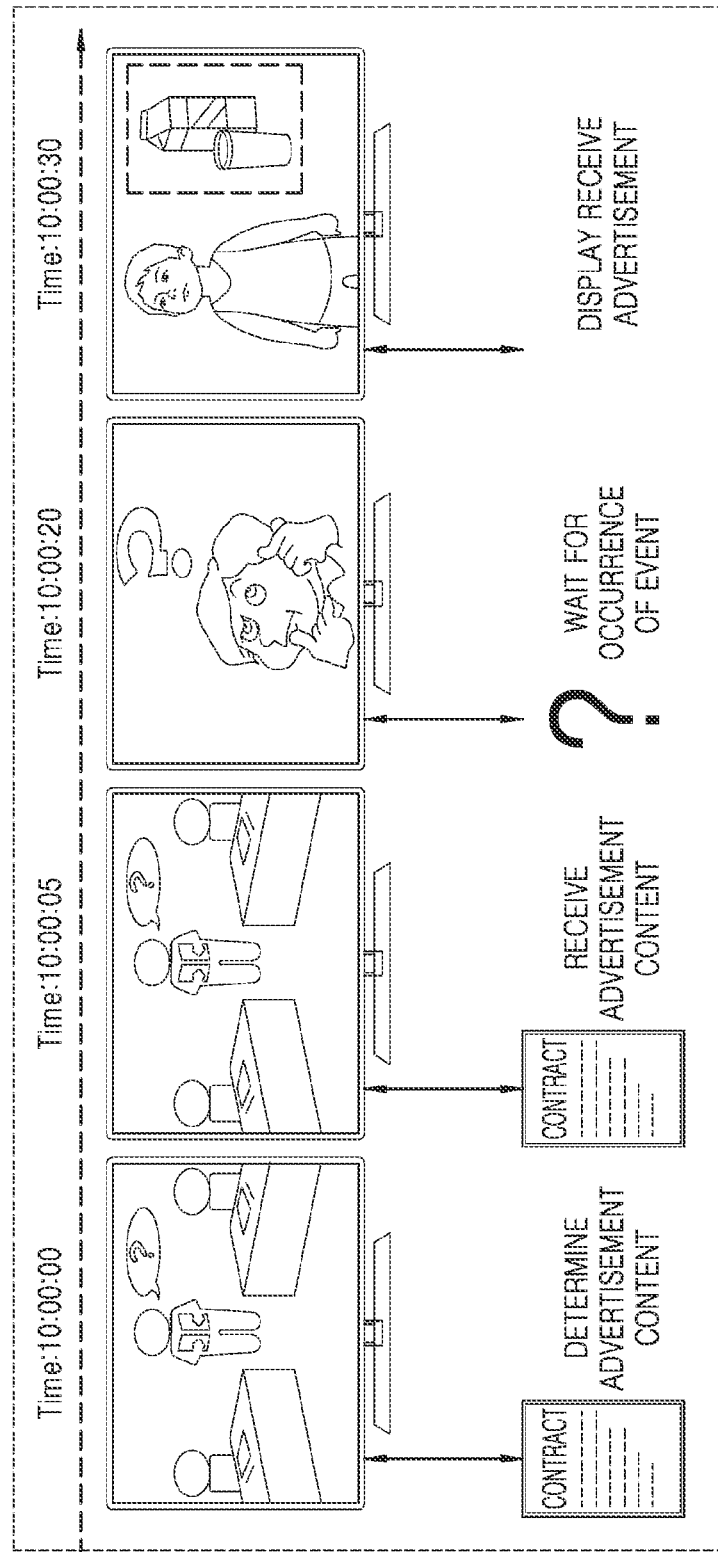
FIG. 21 is a diagram illustrating a scenario of a method for event-based advertisement content transmission, according to an embodiment of the present disclosure.

FIG. 21 is a diagram illustrating a scenario 2100 of a method for event-based advertisement content transmission, according to an embodiment of the present disclosure.

In the present disclosure, a predefined event may include an interrupt signal, an audio, or a user input, but is not limited thereto. Accordingly, the predefined event may be a predefined condition for reproducing the received advertisement content. The event may be predefined by the advertiser, and then recorded in the smart contract, or may be determined by the user by using the user interface 1100.

According to an embodiment of the present disclosure, at 10:00:00, the display device 202 may identify the content that the user is viewing through the display 602. For example, the display device 202 may determine that the genre of the content is "Quiz" through content analysis, and obtain viewing information based on channel information and user information registered in the display device 202. Through the viewing information, the display device 202 may determine that the content being displayed is a "Quiz Show for Kids", and most of users viewing the content are children. Also, while the content is displayed, the display device 202 may determine the advertisement content to be viewed by the user based on the obtained viewing information and the plurality of smart contracts stored in the display device 202.

According to an embodiment of the present disclosure, at 10:00:05, the display device 202 may receive the advertisement content from the advertiser device 206 based on the storage location contained in the advertisement content metadata.

At 10:00:20, while the content is being displayed, the display device 202 may determine whether the predefined event is detected. At 10:00:30, if the predefined event has been detected, the display device 202 may display the received advertisement content. For example, because the content is "Quiz Show for Kids", and most of users viewing the content are children, the determined advertisement content may be "Milk advertisement" for children's health.

In a case where the predefined event is an interrupt signal, the interrupt signal may be a signal indicating that the advertisement content is to be reproduced because a preset period of time elapses after the reproduction of the content is terminated. In a case where the predefined event is a specific audio, the specific audio may be a sound of applause in the content. In a case where the predefined event is a specific user input, the user may cause the display device 202 to display the advertisement content, through a specific gesture, a voice input, or the like. Because the predefined event may be at least one of an interrupt signal, a specific audio, or a specific user input, the display device 202 may reproduce the advertisement content, upon detection of any one of the above-described events.

In the present disclosure, it is described that the advertisement content is reproduced when the predefined event is detected, but the present disclosure is not limited thereto, and the display device 202 may reproduce the advertisement content when the reproduction of the content is terminated.

Figure 22:
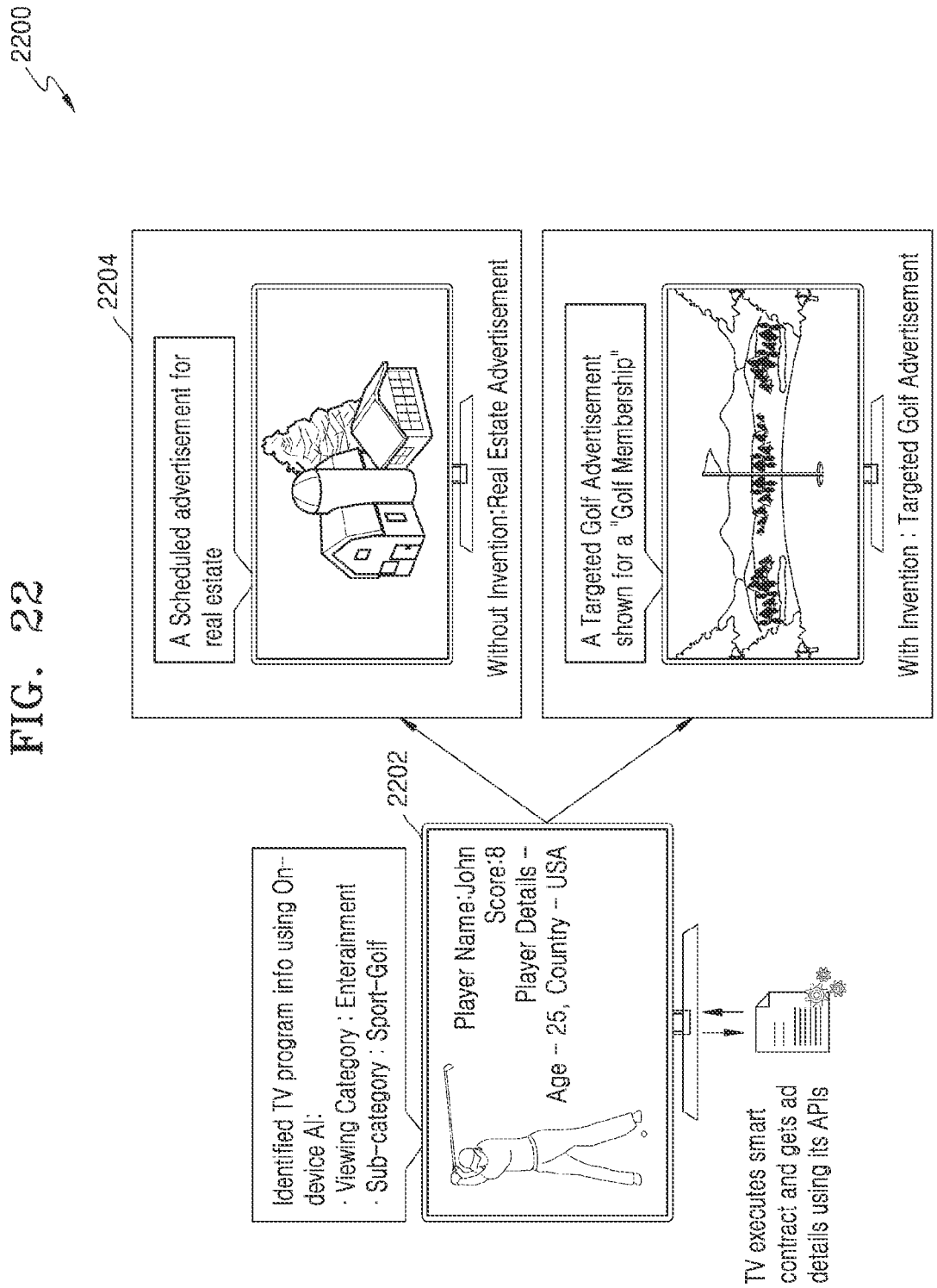
FIG. 22 is a diagram illustrating dynamically replaceable advertisement content, according to an embodiment of the present disclosure.

FIG. 22 is a diagram illustrating dynamically replaceable advertisement content, according to an embodiment of the present disclosure.

According to an embodiment of the present disclosure, the user may be currently viewing a golf game 2202 through the display device 202. Without the method of transmitting advertisement content according to the present disclosure, the user may view a real estate advertisement 2204 in which the user is not interested. However, by the method of transmitting advertisement content according to the present disclosure, the display device 202 may determine that the user is interested in golf, and, accordingly, the display device 202 may reproduce a golf membership advertisement 2206 that is more relevant to the interest of the user than the real estate advertisement 2204. In this case, the display device 202 may determine that the real estate advertisement 2204 is being reproduced, by using an AI algorithm, and replace the real estate advertisement 2204 with the golf membership advertisement 2206 by 'dynamic replacement processing'.

Figure 23:
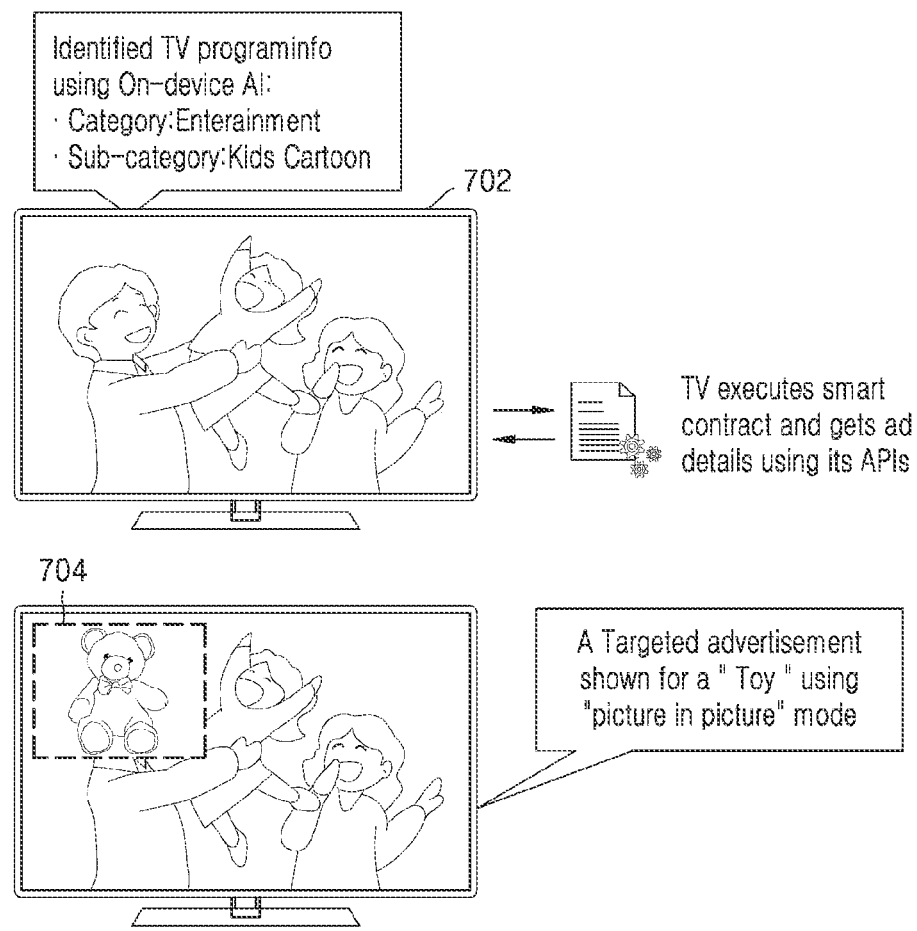
FIG. 23 is a diagram illustrating an example of displaying advertisement content on a display, according to an embodiment of the present disclosure.

FIG. 23 is a diagram illustrating an example of displaying advertisement content on a display, according to an embodiment of the present disclosure.

According to an embodiment of the present disclosure, the display device 202 may display the content on the first display 702. In this case, the display device 202 may determine that the content being displayed is a "Program for children", and may determine to receive child-related advertisement content. Thereafter, the display device 202 may display, on the second display 704, an advertisement related to a children's toy.

Figure 24:
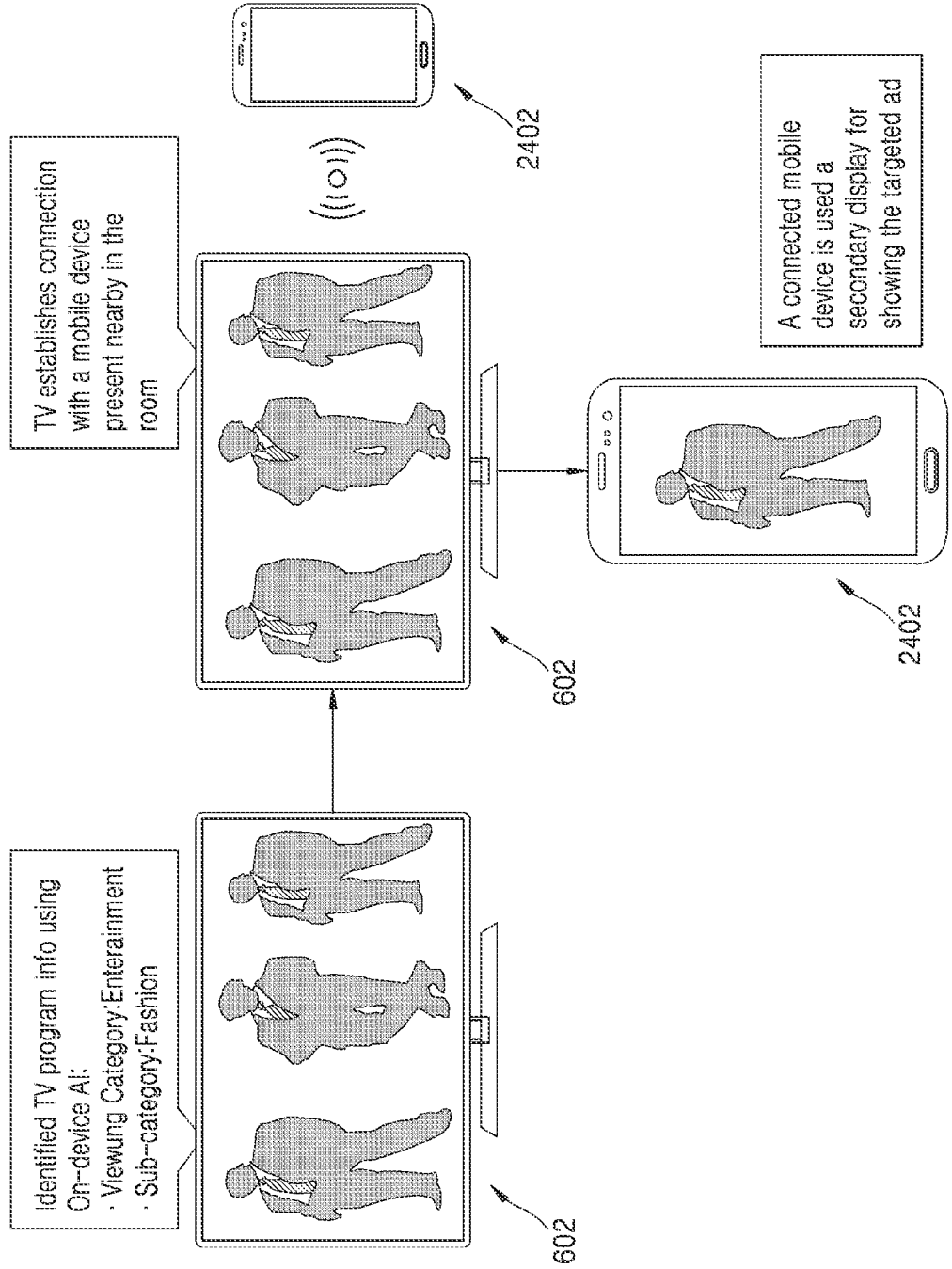
FIG. 24 is a diagram illustrating a system for displaying advertisement content on an external device, according to an embodiment of the present disclosure.

FIG. 24 is a diagram illustrating a system for displaying advertisement content on an external device 2402, according to an embodiment of the present disclosure.

The display device 202 may interwork with the external device 2402 through a wired or wireless communication network. In this case, the external device 2402 may be a smart phone, a laptop, a PDA, or the like.

According to an embodiment of the present disclosure, while the display device 202 is displaying the content on the display 602, the display device 202 may transmit, to the external device 2402, the advertisement content and the information for controlling the reproduction of the advertisement content. Thereafter, the external device 2402 may reproduce the advertisement content based on the received advertisement content and the received information for controlling the reproduction of the advertisement content.

Figure 25:
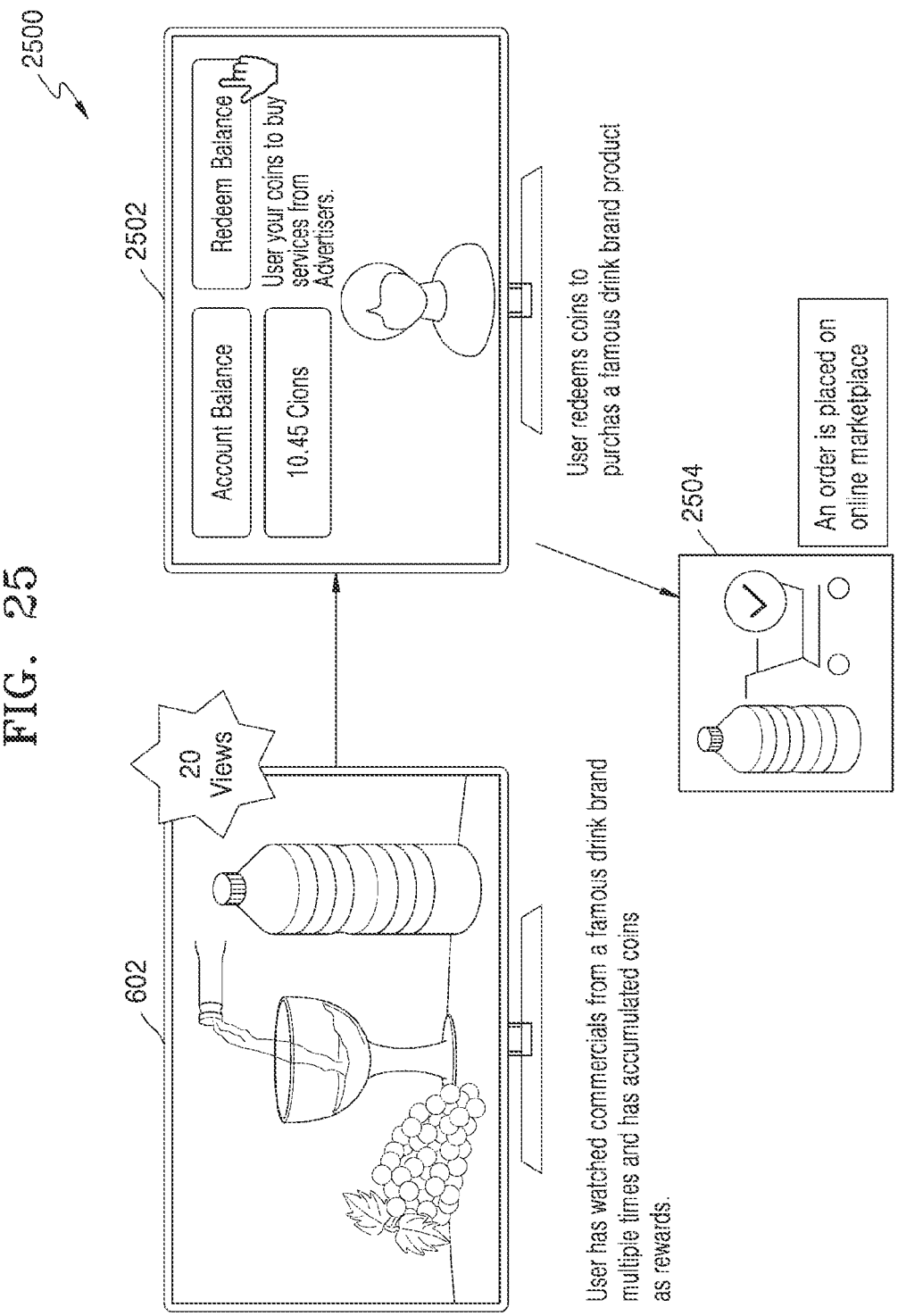
FIG. 25 is a diagram illustrating an example of purchasing a product by using tokens, according to an embodiment of the present disclosure.

FIG. 25 is a diagram illustrating an example 2500 of purchasing a product by using tokens, according to an embodiment of the present disclosure.

According to an embodiment of the present disclosure, the user may view the advertisement content several times through the display 602, and a preset amount of tokens may be deposited into the user account as rewards. The user may purchase a product sold by the advertiser by using the deposited tokens. For example, the user may have viewed, several times, a beverage advertisement broadcast by the advertiser selling a beverage product. The advertiser device 206 may deposit a preset amount of tokens into the user account as rewards for the user for viewing the beverage advertisement, and the user may then purchase the beverage product from the advertiser by using the deposited tokens. An interface 2502 may be related to the user account of the advertiser device 206. The user may check the tokens currently deposited in the user account through the interface 2502, and may purchase a beverage product 2504.

Figure 26:
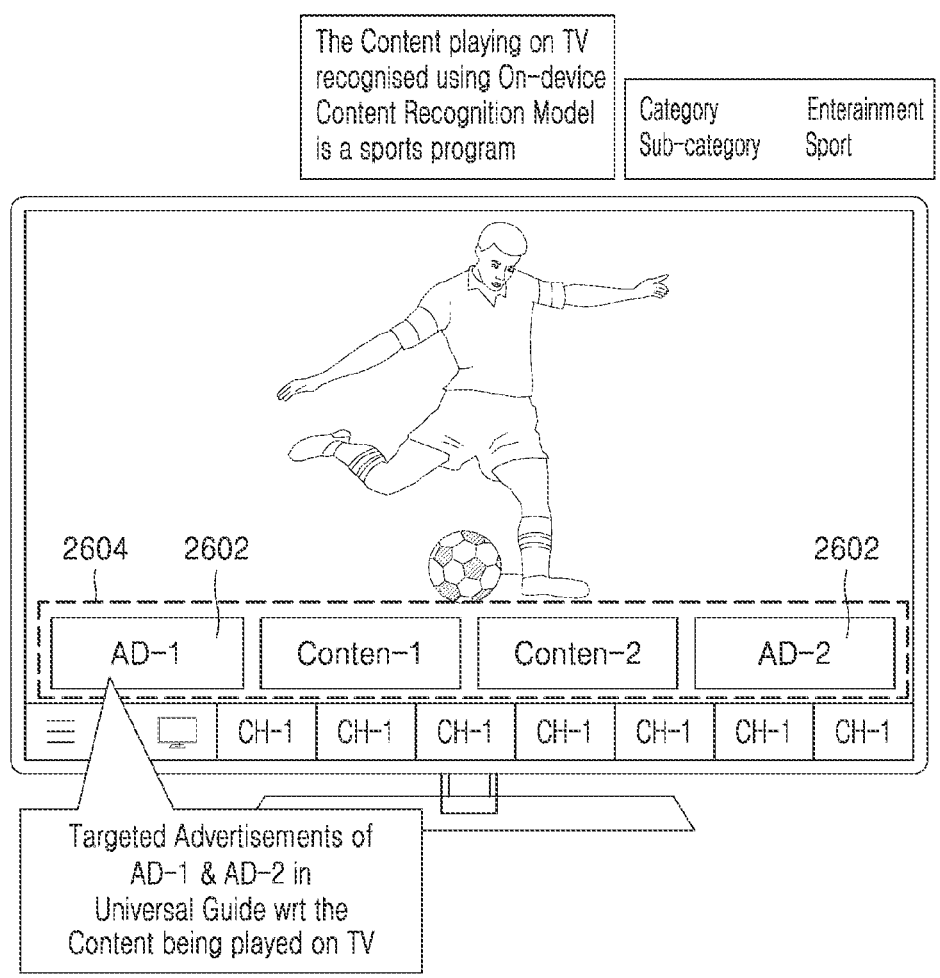
FIG. 26 is a diagram illustrating an example in which a display device inserts advertisement content, according to an embodiment of the present disclosure.

FIG. 26 is a diagram illustrating an example in which the display device 202 inserts advertisement content, according to an embodiment of the present disclosure.

The display 2600 may display a playlist. The playlist may be a list of content items and advertisement content items to be sequentially reproduced by the display device 202. According to an embodiment of the present disclosure, the display device 202 may insert determined advertisement content items AD-1 and AD-2 2602 into the playlist. For example, the display device 202 may insert the advertisement content items AD-1 and AD-2 2602, before the first content item and after the third content item, respectively, and may display the advertisement content item AD-1 before reproducing the first content item, and display the advertisement content item AD-2 after reproducing of the second content item, based on corresponding advertisement content metadata.

Figure 27:
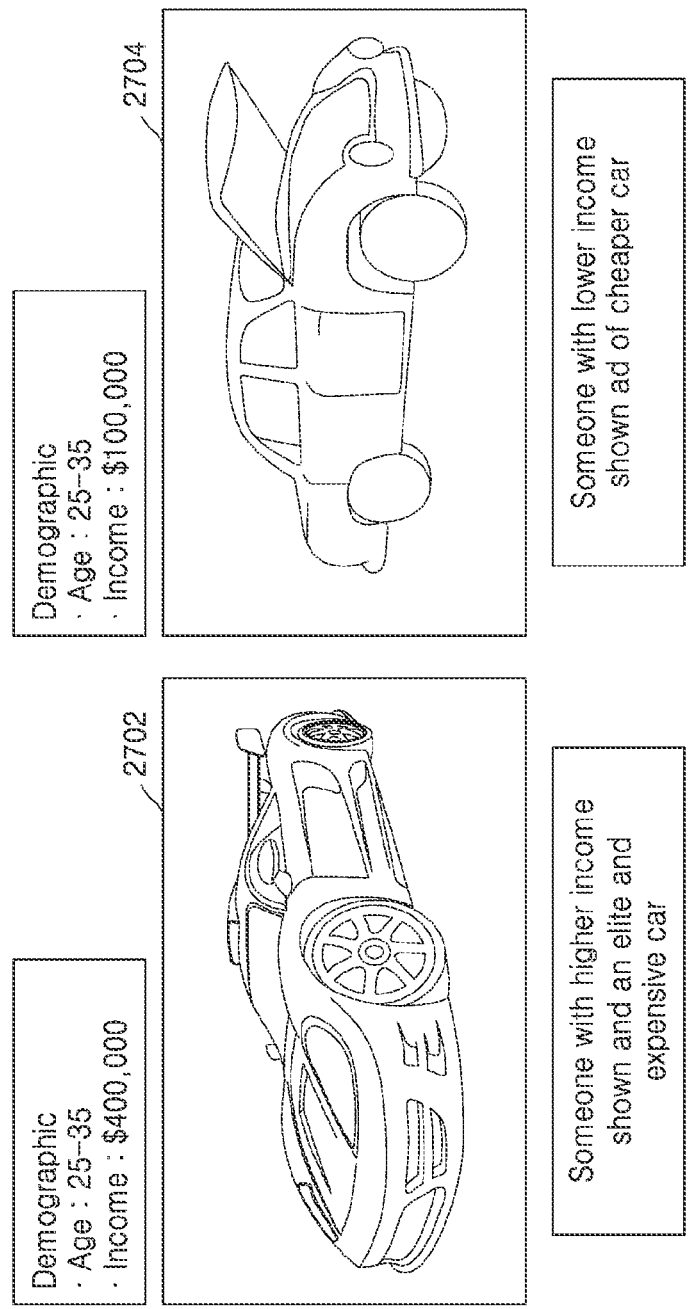
FIG. 27 is a diagram illustrating an example of displaying personalized advertisement content, according to an embodiment of the present disclosure.

FIG. 27 is a diagram illustrating an example of displaying personalized advertisement content, according to an embodiment of the present disclosure.

According to an embodiment of the present disclosure, the display device 202 may determine that the current user is 25 to 35 years old, and his/her annual income is about $400,000, based on the viewing information. Accordingly, the display device 202 may determine the advertisement content to be an advertisement for an expensive car 2702, and display the advertisement content to the user. Similarly, in a case where the display device 202 has determined that the current user is 25 to 35 years old, and his/her annual income is about $100,000, the display device 202 may determine the advertisement content to be an advertisement for a relatively cheap car 2704, and display the advertisement content to the user.

Figure 28:
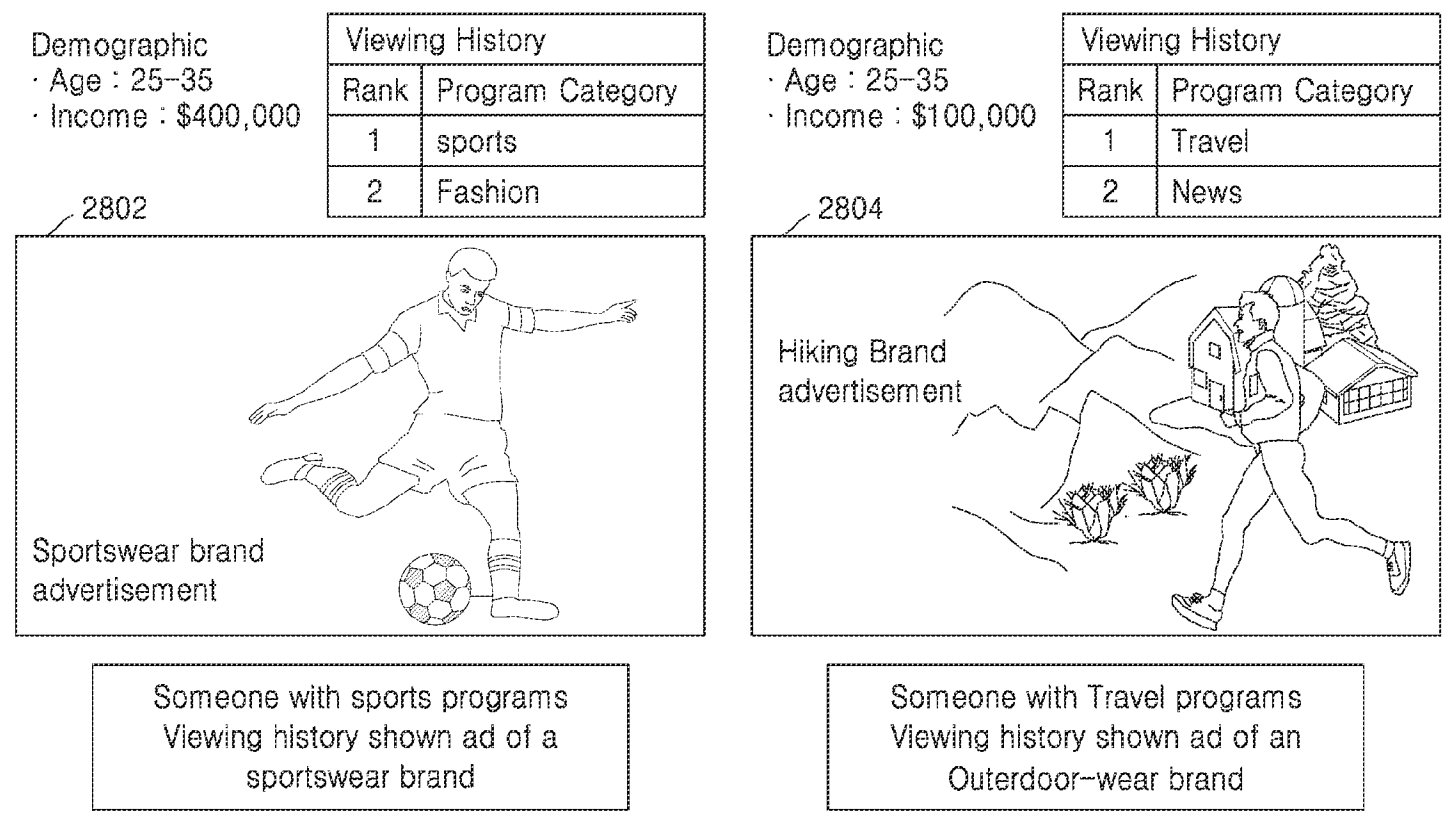

FIG. 28 is a diagram illustrating an example of displaying personalized advertisement content, according to an embodiment of the present disclosure.

According to an embodiment of the present disclosure, the display device 202 may determine that the current user is 25 to 35 years old, his/her annual income is about $100,000, and he/she is interested in sports, based on the viewing information. Accordingly, the display device 202 may determine the advertisement content to be a sportswear advertisement 2802, and display the advertisement content to the user. Similarly, in a case where the display device 202 has determined that the current user is 25 to 35 years old, his/her annual income is about $100,000, and he/she is interested in travel, the display device 202 may determine the advertisement content to be a travel-related advertisement 2804, and display the advertisement content to the user.

Figure 29:
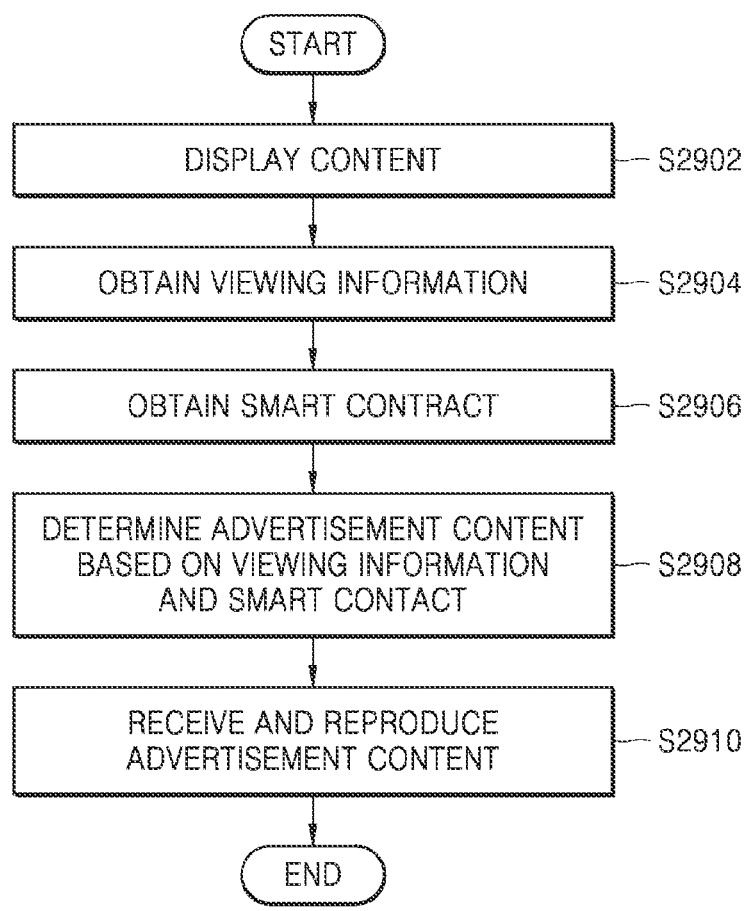
FIG. 29 is a flowchart illustrating a method of transmitting advertisement content to a display device, according to an embodiment of the present disclosure.

FIG. 29 is a flowchart illustrating a method of transmitting advertisement content to a display device 202, according to an embodiment of the present disclosure.

According to an embodiment of the present disclosure, the display device 202 may be a participant on the blockchain network 204. In order for one specific display device 202 to be a participant in the blockchain, the display device 202 needs to download a copy of the blocks connected in the form of a chain. In this case, the blocks may contain record information for all transactions performed before the display device 202 becomes a participant, and may contain the smart contracts shared by the advertiser device on the blockchain network 204. The display device 202 may download a copy of the blocks from an electronic device located closest to the display device 202 based on IP addresses, among the electronic devices on the blockchain network 204, or from an independent server that has a copy of the blocks but does not perform a substantial transaction.

According to an embodiment of the present disclosure, in operation S2902, the display device 202 may display the content on the display 602. In this case, the content may be broadcast by a broadcaster (e.g., a music show, a drama, a sports game, or the like), or may be reproduced by executing an application embedded in the display device 202 (e.g., a game, a broadcast streaming application, or the like).

In operation S2902, the display device 202 may obtain the viewing information. The viewing information may include at least one of information about the user viewing the content, metadata of the content, information about a user's search history and a user's viewing history related to the content, or information about a date of reproduction of the content. In this case, the information about the user may be previously input to the display device 202 by the user to implement the method of the present disclosure. The metadata of the content may include information about the content being displayed, for example, a title, a genre, a language, or a content rating of the content. The metadata of the content may be received when the content is first broadcast, and the display device 202 may further use the AI algorithm in obtaining the metadata of the content. In addition, the display device 202 may determine the category of the content based on user's viewing history information about content items that the user has viewed so far, and/or user's search history information related to specific content.

When the viewing information has been obtained, in operation S2906, the display device 202 may obtain the plurality of smart contracts corresponding to the plurality of advertisement content items, respectively. In this case, the plurality of smart contracts may be data contained in the copy of the blocks that the display device 202 has first downloaded to be a participant, or data that the display device 202 has downloaded in real time after being a participant. Each smart contract may correspond to each advertisement content item. Accordingly, the display device 202 may determine the advertisement content to be viewed by the user based on the obtained viewing information and the smart contract. In this case, one or more smart contracts may exist, and thus one or more advertisement content items may be determined to be viewed. In a case where a plurality of advertisement content items have been determined to be viewed, one or more advertisement content items may be displayed according to the reproduction mode.

In operation S2908, the display device 202 may determine the advertisement content based on the obtained viewing information and the smart contract. Specifically, the display device 202 may determine the advertisement content by matching the viewing information with the advertisement content parameter in the smart contract. In this case, the viewing information may be input to the smart contract. The advertisement content may include the advertisement content metadata, and the display device 202 may receive the advertisement content from the advertiser device 206 based on the storage location contained in the advertisement content metadata.

Thereafter, in operation S2910, the display device 202 may request the advertiser device 206 to transmit the advertisement content, receive the advertisement content from the advertiser device 206 based on the storage location contained in the advertisement content metadata, and reproduce the received advertisement content.

Figure 30:
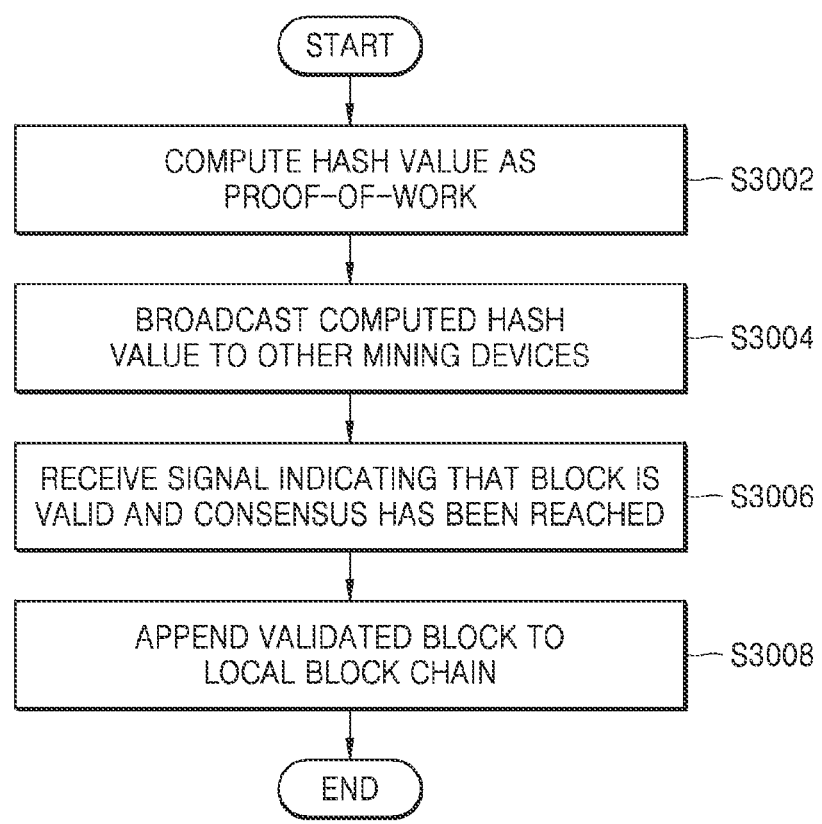
FIG. 30 is a flowchart illustrating a method of verifying the validity of a block of a mining device 402 to reach consensus, according to an embodiment of the present disclosure.

FIG. 30 is a flowchart illustrating a method of verifying the validity of a block of the mining device 402 to reach consensus, according to an embodiment of the present disclosure.

After determining the advertisement content 404, the display device 202 may broadcast, to all electronic devices connected to the blockchain network 204, the record information that the advertisement content has been determined.

Thereafter, in operation S3002, a plurality of mining devices on the blockchain network 204 may compute a hash value by using a predefined algorithm (e.g., SHA-256) to generate a new block, and a specific mining device 402 may have computed the hash value, prior to any other mining devices, thereby generating a new block based on the received record information.

After the hash value has been computed, in operation S3004, the mining device 402 may broadcast the computed hash value to all mining devices on the blockchain network 204 for validation and consensus on the generated block.

Thereafter, in operation S3006, the mining device 402 may receive a signal indicating that the generated block is valid and consensus has been reached, and may append the generated block to the prestored existing blocks in the form of a chain. In this case, the signal indicating that the generated block is valid and the consensus has been reached may be received by the mining device 402 from a majority of other mining devices existing on the blockchain network 204.

Figure 31:
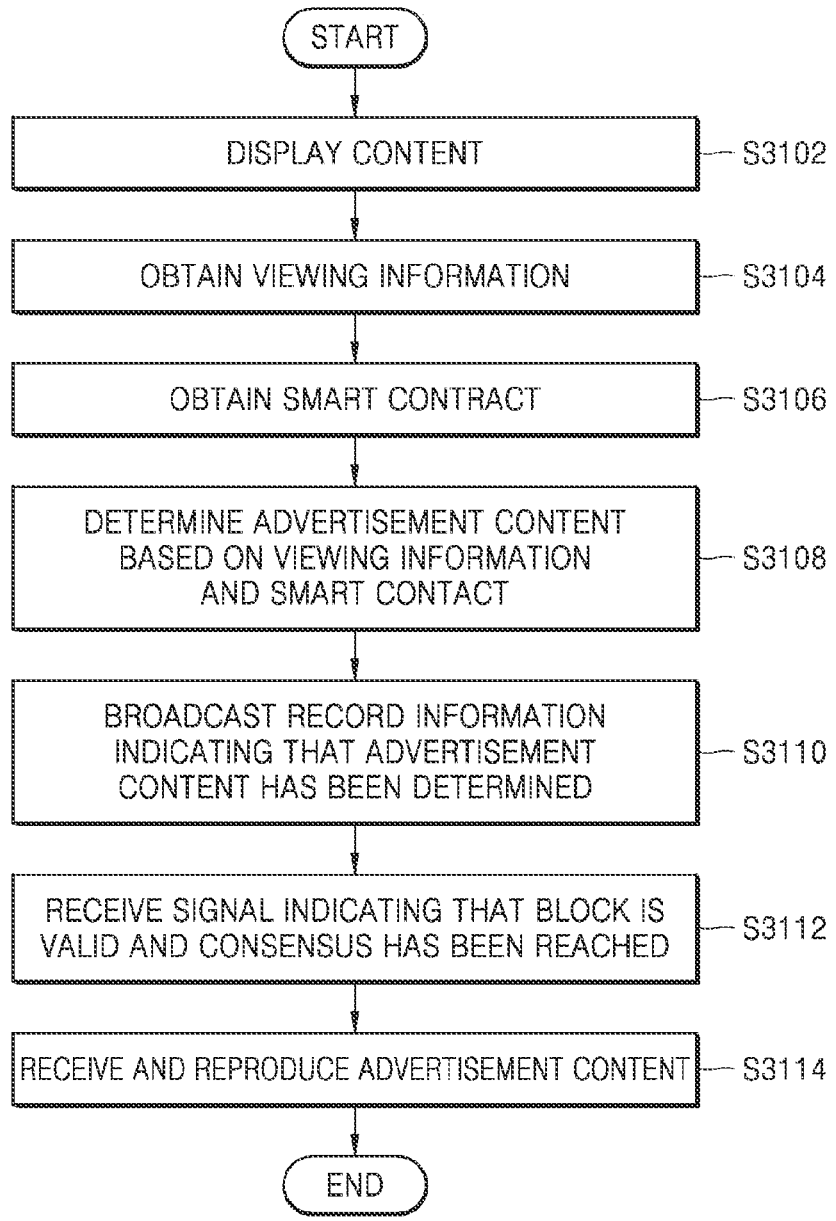
FIG. 31 is a flowchart illustrating a method of transmitting advertisement content to a display device, according to an embodiment of the present disclosure.

FIG. 31 is a flowchart illustrating a method of transmitting advertisement content to the display device 202, according to an embodiment of the present disclosure.

Operations S3102 to S3108 of FIG. 31 correspond to operations S2902 through S2908 of FIG. 29, respectively, and thus detailed descriptions thereof will be omitted.

When the advertisement content has been determined, in operation S3110, the display device 202 may broadcast the record information indicating that the advertisement content has been determined, for validation and consensus.

In operation S3112, the display device 202 may receive the signal indicating that the block generated based on the record information is valid and the consensus has been reached. In this case, the signal indicating that the block is valid and the consensus has been reached may be received from the mining device 402 that has computed the hash value prior to any other mining devices, or may be received from other mining devices on the blockchain network 204.

Thereafter, upon receipt of the signal indicating that the block is valid and the consensus has been reached, in operation S3114, the display device 202 may request the advertiser device 206 to transmit the advertisement content, receive the advertisement content from the advertiser device 206 based on the storage location contained in the advertisement content metadata, and reproduce the received advertisement content.

According to an embodiment of the present disclosure, as an operation separated from the reproduction of the advertisement content, the display device 202 may receive information about the generated block along with the signal indicating that the block is valid and the consensus has been reached. Thereafter, the display device 202 may append the generated block to the blocks including the plurality of smart contracts, in the form of a chain, based on the information about the generated block, and store the modified blocks in the local memory 604. In the present disclosure, the display device 202, as well as all electronic devices on the blockchain network 204, may store copies of the same blocks through the validation and consensus procedures.

Figure 32:
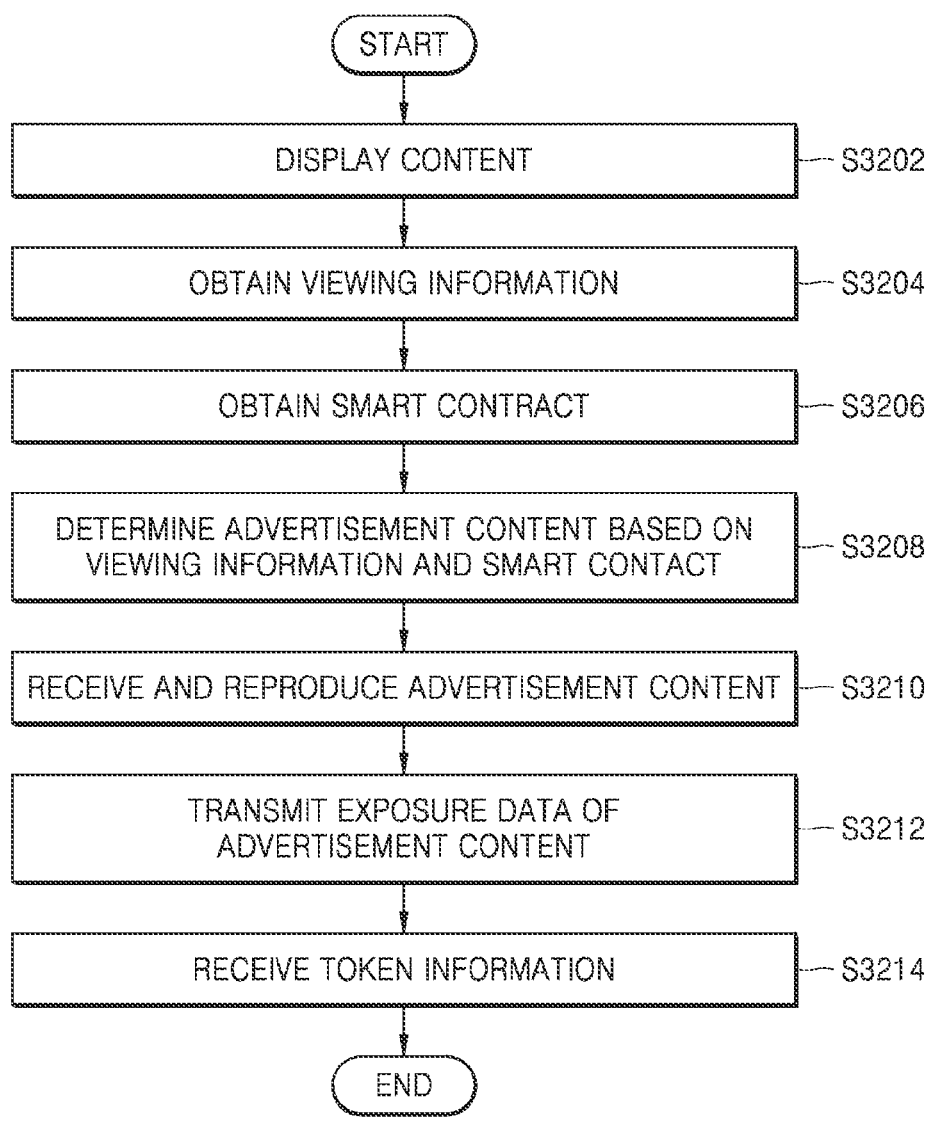
FIG. 32 is a flowchart illustrating a method of transmitting advertisement content to a display device, according to an embodiment of the present disclosure.

FIG. 32 is a flowchart illustrating a method of transmitting advertisement content to the display device 202, according to an embodiment of the present disclosure.

Operations S3202 to S3210 of FIG. 32 correspond to operations S2902 to S2910 of FIG. 29, respectively, and thus detailed descriptions thereof will be omitted.

According to an embodiment of the present disclosure, in operation S3121, the display device 202 may transmit the exposure data of the advertisement content to the advertiser device 206, as the advertisement content is reproduced. In this case, the exposure data may include at least one of the number of times the advertisement content is reproduced by the display device 202, or a reproduction duration of the advertisement content. Because the advertiser device 206 and the display device 202 are storing the same smart contract, when the exposure data of the advertisement content has been transmitted to the advertiser device 206, the advertiser device 206 may deposit a preset amount of tokens into the user account based on the token payment policy of the smart contract. According to an embodiment of the present disclosure, the advertiser device 206 may deposit tokens into the user account of the advertiser device 206 and manage the tokens, and may transmit information about the tokens to the display device 202.

Thereafter, in operation S3214, the display device 202 may receive the information about the tokens, and the user may manage the tokens by using the interface and spend the tokens to purchase a product related to the advertisement content on the advertiser's website.

Figure 33:
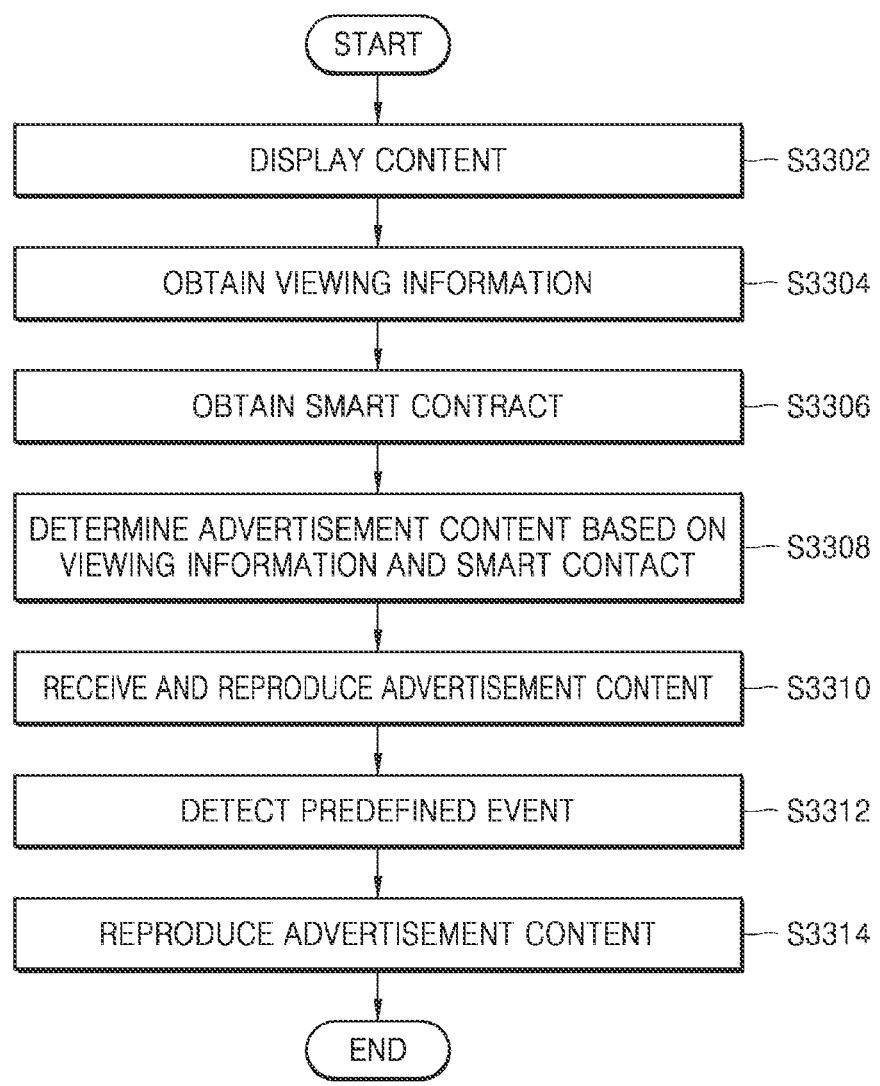
FIG. 33 is a flowchart illustrating a method of transmitting advertisement content to a display device, according to an embodiment of the present disclosure.

FIG. 33 is a flowchart illustrating a method of transmitting advertisement content to the display device 202, according to an embodiment of the present disclosure.

Operations S3302 to S3308 of FIG. 33 correspond to operations S2902 to S2908 of FIG. 29, respectively, and thus detailed descriptions thereof will be omitted.

According to an embodiment of the present disclosure, in operation S3310, the display device 202 may determine the advertisement content, and, in operation S3310, the display device 202 may receive the advertisement content from the advertiser device 206. Thereafter, the display device 202 may not reproduce the advertisement content until a predefined event occurs. In this case, the display device 202 may be in an idle state until the predefined event occurs, or may reproduce another advertisement content broadcast by a broadcaster.

Thereafter, in operation S3312, the display device 202 may detect an occurrence of the predefined event, and, in operation S3314, the display device 202 may reproduce the received advertisement content.

Figure 34:
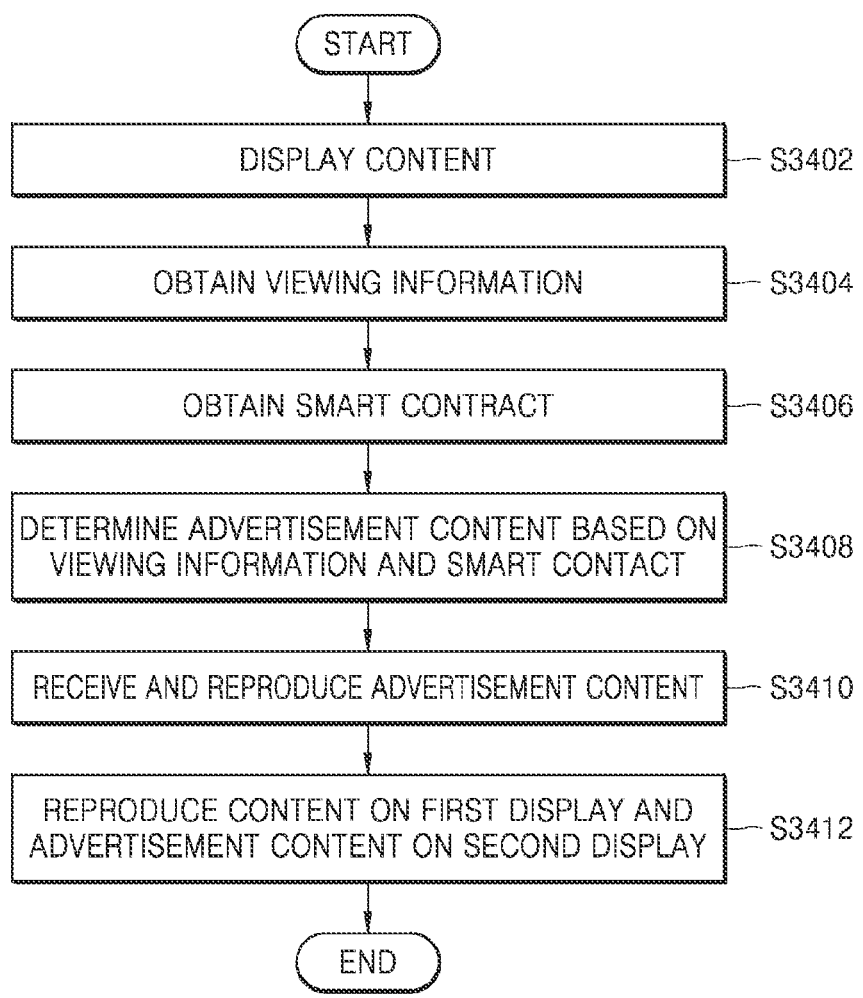
FIG. 34 is a flowchart illustrating a method of transmitting advertisement content to a display device, according to an embodiment of the present disclosure.

FIG. 34 is a flowchart illustrating a method of transmitting advertisement content to the display device 202, according to an embodiment of the present disclosure.

Operations S3402 to S3408 of FIG. 34 correspond to operations S2902 to S2908 of FIG. 29, respectively, and thus detailed descriptions thereof will be omitted.

According to an embodiment of the present disclosure, the display device 202 may determine the advertisement content, and, in operation S3410, the display device 202 may receive the advertisement content from the advertiser device 206.

Thereafter, in operation S3412, the display device 202 may continuously reproduce the content on the first display 702, and reproduce the received advertisement content on the second display 704. Accordingly, the user may view the advertisement content related to content that the user prefers, while viewing the preferred content.

Figure 35:
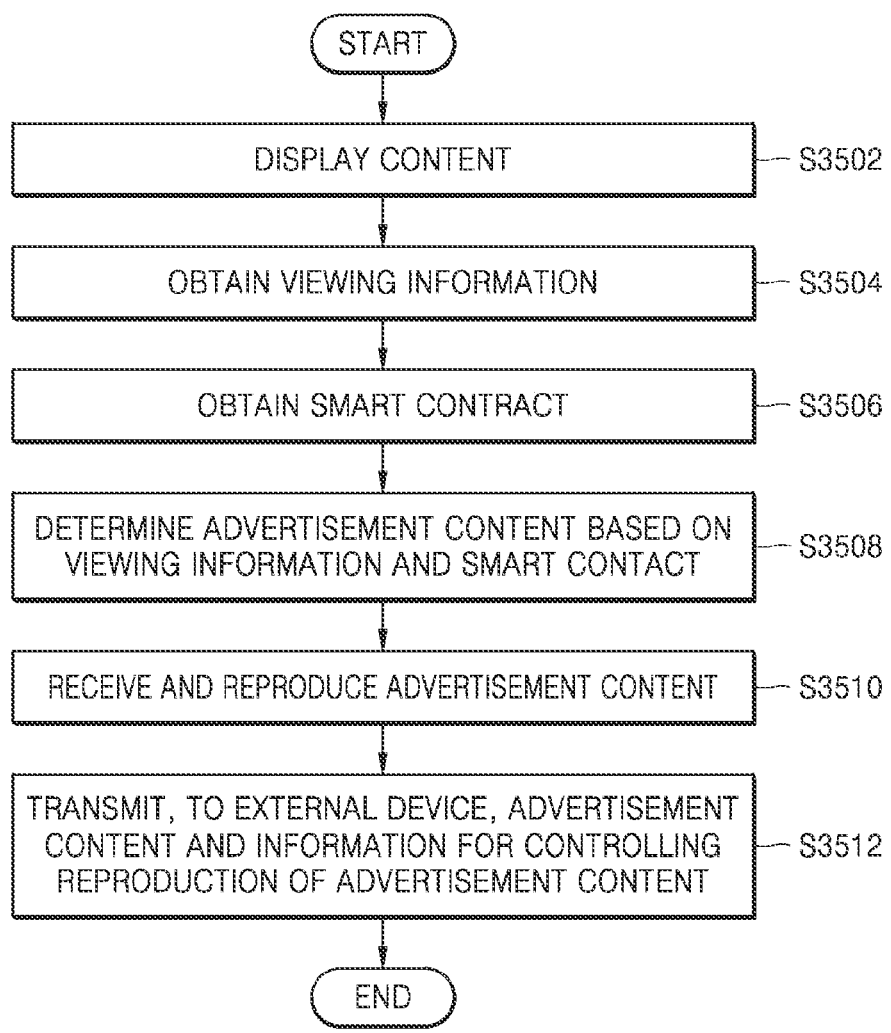
FIG. 35 is a flowchart illustrating a method of transmitting advertisement content to a display device, according to an embodiment of the present disclosure.

FIG. 35 is a flowchart illustrating a method of transmitting advertisement content to the display device 202, according to an embodiment of the present disclosure.

Operations S3502 to S3508 of FIG. 35 may correspond to operations S2902 to S2908 of FIG. 29, respectively, and the display device 202 may determine the advertisement content, and, in operation S3510, the display device 202 may receive the advertisement content from the advertiser device 206.

Thereafter, in operation S3512, the display device 202 may transmit, to the external device 2402, the advertisement content and the information for controlling the reproduction of the advertisement content. Thereafter, the external device 2402 may reproduce the advertisement content based on the received advertisement content and the received information for controlling the reproduction of the advertisement content.

Various embodiments of the present disclosure may be implemented as software that includes one or more instructions stored in a storage medium (e.g., memory 604) that can be read by a machine (e.g., the display device 202 or a computer). For example, a processor (e.g., the processor 608) of the machine may call and execute at least one of the one or more instructions stored in the storage medium. This enables the machine to operate to perform at least one function according to the called at least one instruction. The one or more instructions may include code generated by a compiler or code executable by an interpreter. The machine-readable storage medium may be provided in the form of a non-transitory storage medium. The term 'non-transitory' merely means that the storage medium does not refer to a transitory electrical signal but is tangible, and does not distinguish whether data is stored semi-permanently or temporarily on the storage medium.

According to an embodiment of the present disclosure, the method according to various embodiments disclosed herein may be included in a computer program product and provided. The computer program product may be traded between a seller and a purchaser as a commodity. The computer program product may be distributed in a form of a machine-readable storage medium (e.g., compact disk read only memory (CD-ROM)), or may be distributed online (e.g., downloaded or uploaded) through an application store (e.g., Google PlayTM) or directly between two user devices (e.g., smart phones). In the case of online distribution, at least a portion of the computer program product (e.g., a downloadable app) may be temporarily stored in a machine-readable storage medium such as a manufacturer's server, an application store's server, or a memory of a relay server.

The embodiments of the present disclosure have been described with reference to the accompanying drawings. It will be understood by one of skill in the art that various changes in form and details may be made therein without departing from the spirit and essential features of the present disclosure. The disclosed embodiments should be considered in descriptive sense only and not for purposes of limitation.

The invention claimed is:

1. A display device comprising:
    a communication unit configured to transmit and receive data;
    a display to display content;
    a memory storing one or more instructions; and
    at least one processor configured to execute the one or more instructions stored in the memory to:
        download a copy of blocks connected in a form of a chain from an electronic device on a blockchain network, the blocks containing a plurality of smart contracts that is contracts corresponding to a plurality of advertisement content items, respectively, obtain content-related information by using at least one of a frame of the content and a content recognition artificial intelligence (AI) algorithm, the content-related information including category of the content, generate viewing information about the content, based on at least one of usage history of the display device, user input and the content-related information, determine advertisement content related to the content from among the plurality of advertisement content items based on the viewing information and the plurality of smart contracts, wherein the advertisement content includes advertisement content metadata, broadcast a record information indicating that the advertisement content has been determined to the blockchain network, receive a signal indicating that a new block generated based on the record information is valid and information about the new block, append the new block to the downloaded copy of blocks, based on the information about the new block, in response to receipt of the signal indicating that the new block is valid, receive the determined advertisement content from an advertiser device based on the advertisement content metadata, detect an occurrence of a predefined event while the content is being displayed, and reproduce the received advertisement content upon detection of the predefined event.

2. The display device of claim 1, wherein the viewing information includes at least one of information about a user viewing the content, metadata of the content, information about a user's viewing history of the content, information about a date of reproduction or a number of times of reproduction of the content, or the category of the content.

3. The display device of claim 1,
wherein the plurality of smart contracts include advertisement content parameters corresponding to the plurality of advertisement content items, respectively, and
wherein the at least one processor is further configured to determine the advertisement content by matching the advertisement content parameters with the viewing information.

4. The display device of claim 3, wherein the advertisement content parameters include at least one of information about a user who will view the advertisement content, information about a reproduction duration of the advertisement content, or advertiser information.

5. The display device of claim 1,
wherein the advertisement content metadata further includes at least one of a reproduction duration of the advertisement content, a title, a language, or a storage location,
wherein the at least one processor is further configured to receive the determined advertisement content by using the advertisement content metadata.

6. The display device of claim 1, wherein the new block is appended to the blocks in a form of a chain and shared with the advertiser device and the other display devices.

7. The display device of claim 1,
wherein the at least one processor is further configured to provide exposure data of the determined advertisement content to the advertiser device, and wherein the exposure data of the advertisement content includes at least one of a number of times of reproduction of the advertisement content, or a reproduction duration of the advertisement content.

8. The display device of claim 7, wherein the at least one processor is further configured to receive information about tokens from the advertiser device based on the exposure data of the advertisement content.

9. The display device of claim 1,
wherein the predefined event includes at least one of an interrupt signal, an audio, or a user input.

10. The display device of claim 1,
wherein the display includes a first display and a second display, and
wherein the at least one processor is further configured to execute the one or more instructions to control the first display and the second display such that the advertisement content is reproduced on the second display while the content is being displayed on the first display.

11. The display device of claim 1, wherein the at least one processor is further configured to control the communication unit to transmit, to an external device interworking with the display device, the advertisement content and information for controlling reproduction of the advertisement content.

12. A method of controlling a display device, the method comprising:
displaying content;
downloading a copy of blocks connected in a form of a chain from an electronic device on a blockchain network, the blocks containing a plurality of smart contracts that is contracts corresponding to a plurality of advertisement content items, respectively,
obtaining content-related information by using at least one of a frame of the content and a content recognition artificial intelligence (AI) algorithm, the content-related information including category of the content;
generating viewing information about the content, based on at least one of usage history of the display device, user input and the content-related information;
determining advertisement content related to the content from among the plurality of advertisement content items based on the viewing information and the plurality of smart contracts, wherein the advertisement content includes advertisement content metadata;
broadcasting a record information indicating that the advertisement content has been determined to the blockchain network;
receiving a signal indicating that a new block generated based on the record information is valid and information about the new block;
appending the new block to the downloaded copy of blocks, based on the information about the new block;
in response to receipt of the signal indicating that the new block is valid, receiving the determined advertisement content from an advertiser device based on the advertisement content metadata;
detecting an occurrence of a predefined event while the content is being displayed; and
reproducing the received advertisement content upon detection of the predefined event.

13. The method of claim 12,
wherein the plurality of smart contracts include advertisement content parameters corresponding to the plurality of advertisement content items, respectively, and wherein the determining of the advertisement content comprises determining the advertisement content by matching the advertisement content parameters with the viewing information.

14. A computer-readable recording medium storing one or more instructions for controlling a display device, wherein the one or more instructions cause the display device to:

display content;

download a copy of blocks connected in a form of a chain from an electronic device on a blockchain network, the blocks containing a plurality of smart contracts that is contracts corresponding to a plurality of advertisement content items, respectively;

obtain content-related information by using at least one of a frame of the content and a content recognition artificial intelligence (AI) algorithm, the content-related information including category of the content;

generate viewing information about the content, based on at least one of usage history of the display device, user input and the content-related information;

determine advertisement content related to the content from among the plurality of advertisement content items based on the viewing information and the plurality of smart contracts, wherein the advertisement content includes advertisement content metadata;

broadcast a record information indicating that the advertisement content has been determined to the blockchain network;

receive a signal indicating that a new block generated based on the record information is valid and information about the new block;

append the new block to the downloaded copy of blocks, based on the information about the new block;

in response to receipt of the signal indicating that the new block is valid, receive the determined advertisement content from an advertiser device based on the advertisement content metadata;

detect an occurrence of a predefined event while the content is being displayed; and reproduce the received advertisement content upon detection of the predefined event.

* * * * *